(12) United States Patent
Kawase et al.

(10) Patent No.: US 10,731,770 B2
(45) Date of Patent: Aug. 4, 2020

(54) ELECTRIC FLOW CONTROL VALVE AND ACTUATOR

(71) Applicants: DENSO CORPORATION, Kariya, Aichi-pref. (JP); SOKEN, INC., Nishio, Aichi-pref. (JP)

(72) Inventors: Yasuhiro Kawase, Nishio (JP); Yukikatsu Ozaki, Nishio (JP); Mikio Matsuda, Nishio (JP); Tetsuya Itou, Kariya (JP); Sadahisa Onimaru, Nishio (JP); Hiroki Ishii, Nishio (JP)

(73) Assignees: DENSO CORPORATION, Kariya, Aichi-pref. (JP); SOKEN, INC., Nisshin, Aichi-pref. (JP)

( * ) Notice: Subject to any disclaimer, the term of this patent is extended or adjusted under 35 U.S.C. 154(b) by 263 days.

(21) Appl. No.: 15/743,850

(22) PCT Filed: Jul. 7, 2016

(86) PCT No.: PCT/JP2016/070129
§ 371 (c)(1),
(2) Date: Jan. 11, 2018

(87) PCT Pub. No.: WO2017/003358
PCT Pub. Date: Mar. 2, 2017

(65) Prior Publication Data
US 2018/0202569 A1    Jul. 19, 2018

(30) Foreign Application Priority Data

Aug. 27, 2015  (JP) .................................. 2015-168145

(51) Int. Cl.
*F16K 31/04* (2006.01)
*F16K 1/44* (2006.01)
(Continued)

(52) U.S. Cl.
CPC ....... *F16K 31/047* (2013.01); *B60H 1/00485* (2013.01); *F16K 1/44* (2013.01);
(Continued)

(58) Field of Classification Search
CPC ...... F16K 31/047; F16K 31/04; F16K 31/504; F16K 31/53; F16K 31/508; F16K 31/043; Y10T 137/87692
(Continued)

(56) References Cited

U.S. PATENT DOCUMENTS 6,460,567 B1 * 10/2002  Hansen, III ............. F16K 31/04
137/554

FOREIGN PATENT DOCUMENTS

CN         2568883 Y      8/2003
JP       H05215258 A      8/1993
(Continued)

OTHER PUBLICATIONS

English Machine Translation of JPH0650444A, provided from Espacenet.com (Year: 1994).*

*Primary Examiner* — Reinaldo Sanchez-Medina
*Assistant Examiner* — Nicole Gardner
(74) *Attorney, Agent, or Firm* — Harness, Dickey & Pierce, P.L.C.

(57) ABSTRACT

An actuator includes a rod, an electric motor to generate a rotational driving force on supply of electricity, an output shaft to output the rotational driving force of the electric motor to the rod, a feed screw mechanism, and a rotation prevention mechanism. The feed screw mechanism includes a female screw portion formed on one of the output shaft and the rod, and a male screw portion formed on the other to mesh with the female screw portion. The rotation prevention mechanism is configured to regulate rotation of the rod caused by the rotational driving force of the electric motor.

12 Claims, 23 Drawing Sheets

(51) Int. Cl.
  *F16K 11/14*   (2006.01)
  *B60H 1/00*    (2006.01)
  *F16K 31/53*   (2006.01)

(52) U.S. Cl.
  CPC .............. *F16K 11/14* (2013.01); *F16K 31/04* (2013.01); *F16K 31/53* (2013.01)

(58) Field of Classification Search
  USPC ........................................ 251/129.11, 129.13
  See application file for complete search history.

(56) References Cited

FOREIGN PATENT DOCUMENTS

| | | | | |
|---|---|---|---|---|
| JP | H0650444 B2 * | 6/1994 | ........... | G05B 19/231 |
| JP | 2006118723 A | 5/2006 | | |
| JP | 2013204695 A | 10/2013 | | |
| JP | 2015218941 A | 12/2015 | | |
| WO | WO-2016072070 A1 | 5/2016 | | |

* cited by examiner

FIG. 5

| OPERATION MODE | FIRST FLOW CONTROL PORTION | SECOND FLOW CONTROL PORTION |
|---|---|---|
| HEATING OPERATION | FULL CLOSE | FULL CLOSE |
| DEHUMIDIFYING AND HEATING OPERATION | FLOW CONTROL | FULL CLOSE |
| COOLING OPERATION | FULL CLOSE | FLOW CONTROL | ic Application No. 2015-168145 filed on Aug. 27, 2015. The entire disclosures of all of the above applications are incorporated herein by reference.

ELECTRIC FLOW CONTROL VALVE AND ACTUATOR

CROSS REFERENCE TO RELATED APPLICATIONS

This application is a U.S. National Phase Application under 35 U.S.C. 371 of International Application No. PCT/JP2016/070129 filed on Jul. 7, 2016 and published in Japanese as WO 2017/033589 A1 on Mar. 2, 2017. This application is based on and claims the benefit of priority from Japanese Patent Application No. 2015-168145 filed on Aug. 27, 2015. The entire disclosures of all of the above applications are incorporated herein by reference.

TECHNICAL FIELD

The present disclosure relates to an electric flow control valve, which has two inlet holes and one outlet hole and controls a flow quantity of fluid flowing from one of the inlet holes. The present disclosure relates to an actuator.

BACKGROUND ART

A known this kind of flow control valve includes two valve elements, which are opposed to each other and equipped to an opening portion, which passes from two inflow passages to an outflow passage. The flow control valve causes a valve shaft, which is driven by an electric actuating device in a thrust direction, to displace each valve element independently (for example, refer to Patent Literature 1).

The flow control valve disclosed in the Patent Literature 1 uses a geared motor as the electric actuating device. In addition, the flow control valve employs a configuration in which a screw portion is formed in a valve shaft and a plug affixed to the housing and in which positive rotation and negative rotation of the geared motor are made via two gears to perform thrust driving while rotating the valve shaft.

PRIOR TECHNICAL LITERATURE

Patent Literature

PATENT LITERATURE 1: Publication of Japanese Unexamined Patent Application No. 05-215258

SUMMARY OF INVENTION

The configuration of the actuator of the flow control valve described in Patent Literature 1, in which a rod being the valve shaft is thrust driven while being rotated, requires an extra output power of the motor by rotation of the rod when performing thrust driving the rod.

Furthermore, in the configuration to thrust drive the rod while rotating the rod, when the rod pushes up the valve element, a friction loss arises between the rod and the valve element. This becomes a factor to require the motor to increase output power, and therefore, it is not desirable.

As described above, the configuration in such a flow control valve described in Patent Literature 1 to thrust drive the rod while rotating the rod has an issue such as a low transmission efficiency of the output power when the actuator displaces each valve element.

In addition, the flow control valve described in Patent Literature 1 has a configuration to drive the rod by using the actuator equipped to one end side of the rod in the axial direction and would increase in size in the axial direction. Therefore, downsizing of the actuator is desired. Downsizing of an actuator is an issue required not only to a flow control valve but also to another device.

It is one object of the present disclosure to produce an electric flow control valve enabling to enhance a transmission efficiency of an output power when displacing a valve element with an actuator.

It is another object of the present disclosure to produce an actuator enabling to downsize in an axial direction.

According to one aspect of the present disclosure, an electric flow control valve comprises:

a housing formed therein with a first fluid passage to guide fluid, which flows from a first inlet hole, to an outlet hole, which is to cause fluid to flow to an outside, a second fluid passage to guide fluid, which flows from a second inlet hole to the outlet hole;

a first valve element arranged to be opposed to a first valve seat portion, which is formed at a portion of the housing defining the first fluid passage, to close the first fluid passage when making contact with the first valve seat portion and to open the first fluid passage when being spaced from the first valve seat portion;

a second valve element arranged to be opposed to a second valve seat portion, which is formed at portion of the housing defining the second fluid passage, to close the second fluid passage when making contact with the second valve seat portion and to open the second fluid passage when being spaced from the second valve seat portion; and an actuator to displace the first valve element and the second valve element in a range including a first valve element control region in which the first fluid passage is opened to control a flow quantity of fluid in the first fluid passage while the second fluid passage is closed, a second valve element control region in which the second fluid passage is opened to control a flow quantity of fluid flowing in the second fluid passage while the first fluid passage is closed, and a both valve full close region in which both the first fluid passage and the second fluid passage are closed.

The first valve element and the second valve element are arranged to be coaxial in the housing.

The actuator includes:

a rod to slide along a shaft line of the first valve element and the second valve element to displace the first valve element and the second valve element in the range including the first valve element control region, the second valve element control region, and the both valve full close region;

an electric motor to generate a rotational driving force on supply of electricity;

an output shaft to output the rotational driving force of the electric motor to the rod;

a feed screw mechanism configured with a female screw portion, which is formed on one of the output shaft and the rod, and a male screw portion, which is formed on an other of the output shaft and the rod to mesh with the female screw portion, to convert the rotational driving force of the electric motor is converted into a thrust force in an axial direction of the rod; and a rotation prevention mechanism to regulate rotation of the rod caused by the rotational driving force of the electric motor.

In this way, the configuration, in which the male screw portion and the female screw portion are formed on the output shaft and the rod to form the feed screw mechanism, and in which the rotation prevention mechanism is to regulate rotation of the rod, enables to restrain loss in the output power caused by rotation of the rod. That is, the configuration of the present disclosure enables to enhance a transmission efficiency of the output power when the actuator displaces each of the valve elements, compared with a configuration in which the rod is moved in the axial direction while being rotated.

According to another aspect of the present disclosure, an actuator comprises:

a rod;

an electric motor including a rotor, which includes an eccentric shaft, and a stator, which generates a rotational magnetic field applied to the rotor, to generate a rotational driving force on supply of electricity;

an output shaft to output the rotational driving force of the electric motor to the rod;

a feed screw mechanism configured with a female screw portion, which is formed on the output shaft, and a male screw portion, which is formed on the rod to mesh with the female screw portion, to convert the rotational driving force of the electric motor into a thrust force in an axial direction of the rod;

a rotation prevention mechanism to regulate rotation of the rod caused by the rotational driving force of the electric motor; and a deceleration mechanism to decelerate the rotational output of the electric motor and to transmit the rotational output to the output shaft.

The electric motor includes a rotor, which includes an eccentric shaft, and a stator, which generates a rotational magnetic field applied to the rotor.

The deceleration mechanism includes an internal gear, which is formed inside a portion of the housing to surround an outer circumferential periphery of the rotor, and, an external gear, which is formed with a plurality of outer teeth on a radially outside and meshed with inner teeth of the internal gear to rotate according to a difference between a number of the outer teeth and a number of the inner teeth when revolving in synchronization with the eccentric portion. The external gear is located outside the eccentric shaft and is connected with the output shaft via a rotation transmission pin to transmit a rotational component to the output shaft.

In the actuator of the present disclosure, the feed screw mechanism is formed with the male screw portion and the female screw portion, which are formed on the output shaft and the rod, and rotation of the rod is regulated with the rotation prevention mechanism. Therefore, it enables to move the rod in the axial direction without rotating.

In particular, in a case where the deceleration mechanism of the present disclosure employs the configuration where the internal gear and the external gear, which form the deceleration mechanism, are arranged on the radially outside of the rotor, the deceleration mechanism and the rotor do not overlap in the axial direction. Therefore, the arrangement configuration enables to downsize the actuator in the axial direction.

Furthermore, the deceleration mechanism of the present disclosure enables to increase the inner diameter of the internal gear and the outer diameter of the external gear. Therefore, a force acting on each tooth when the rotational torque is transmitted becomes smaller, compared with that in a configuration of such as planetary gears to transmit force at a small diameter position. Therefore, the thickness of the internal gear and the external gear and the like can be reduced, and the size of the deceleration mechanism in the axial direction can be reduced. As a result, it enables to downsize the actuator in the axial direction.

BRIEF DESCRIPTION OF THE DRAWINGS

FIG. 5 it is a view showing an operation of each flow control portion in each operation mode of the integrated valve according to the first embodiment;

DESCRIPTION OF EMBODIMENTS

As follows, embodiments of the present disclosure will be described with reference to drawings. In addition, in each of the following embodiments, in a case where a subject is the same as or equivalent to the subject, which has been described in a preceding embodiment, the same reference number will be denoted, and description thereof may be omitted. In addition, in each embodiment, in a case where a part of an element is described, an element, which has been described in a preceding embodiment, may be applied to another part of the element. The following embodiments may be partially combined, even though explicit description is not made, unless the combination raises interference.

First Embodiment

Figure 1:
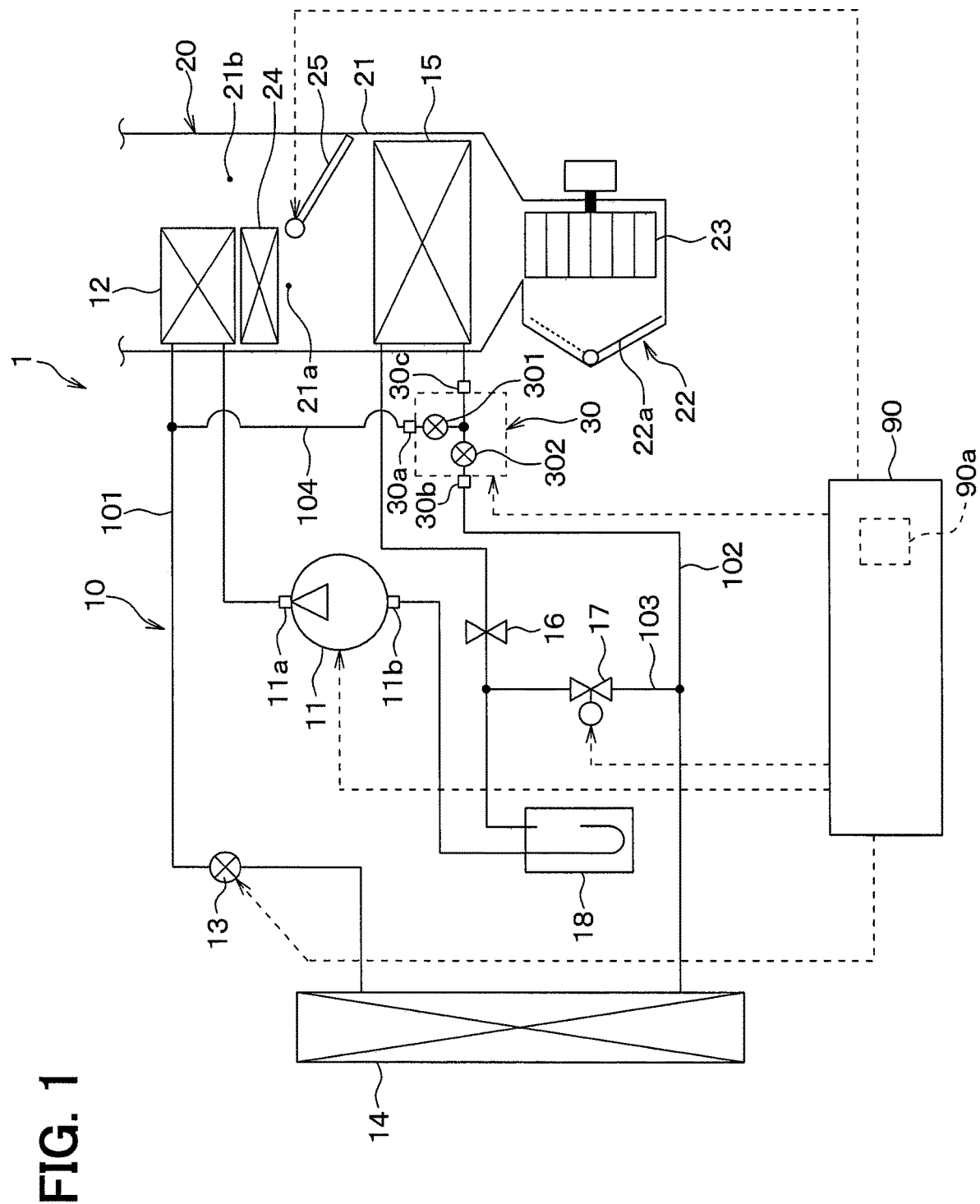
FIG. 1 it is an overall diagram of a vehicle airconditioner applied with an integrated valve according to a first embodiment.

To begin with, the first embodiment will be described with reference to FIGS. 1 to 10. As shown in FIG. 1, the present embodiment will describe an example in which an integrated valve 30, which is an electric flow control valve of the present disclosure, is applied to a vehicle airconditioner 1 for air-conditioning a vehicle interior. In the present embodiment, an actuator of the present disclosure is applied to the integrated valve 30.

The vehicle airconditioner 1 of the present embodiment is equipped in a hybrid vehicle, which obtains a driving force for traveling the vehicle from an internal combustion engine (not shown) and an electric motor for traveling.

Herein, waste heat emitted in a hybrid vehicle and an electric vehicle is smaller compared with waste heat emitted in a vehicle obtaining a driving force for traveling the vehicle only from an internal combustion engine. Therefore, a hybrid vehicle and an electric vehicle hardly secure a heat source for heating the vehicle interior with the indoor air-conditioning unit 20.

The vehicle airconditioner 1 of the present embodiment has a configuration, which causes the indoor air-conditioning unit 20 to perform heating in the vehicle interior by using, as a heat source, high-temperature and high-pressure coolant, which is discharged from a compressor 11 of a steam compression type refrigeration cycle 10.

The refrigeration cycle 10 of the present embodiment employs, as a coolant, HFC coolant (for example, R134a) and configures a steam compression type subcritical refrigeration cycle in which pressure of high-pressure side coolant does not exceed a critical pressure of the coolant. Needless to say, HFO coolant (for example, R1234yf), carbon dioxide, and the like may be employed as a coolant. The coolant contains freezer oil (namely, lubricating oil) for lubricating the compressor 11. A part of the freezer oil circulates together with the coolant inside the cycle.

The refrigeration cycle 10 is configured to switch a passage of the coolant thereby to set a coolant circuit at the time of a heating operation to heat the vehicle interior, a coolant circuit at the time of a dehumidifying and heating operation to heat the vehicle interior while dehumidifying the vehicle interior, or a coolant circuit at the time of an cooling operation to air-condition the vehicle interior.

Figure 2:
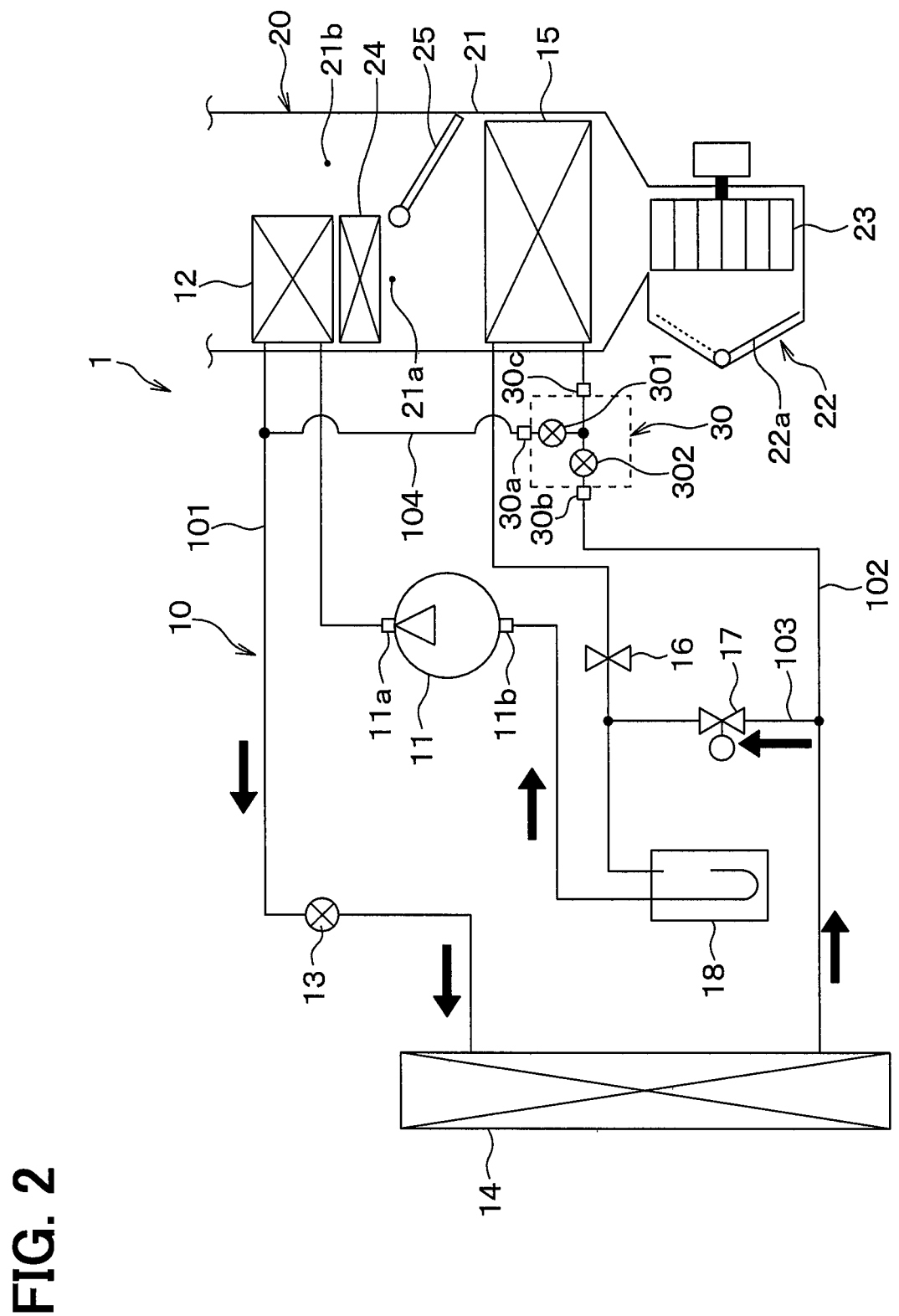
FIG. 2 it is an overall diagram of the vehicle airconditioner showing a flow of coolant in a refrigeration cycle at the time of a heating operation.
Figure 3:
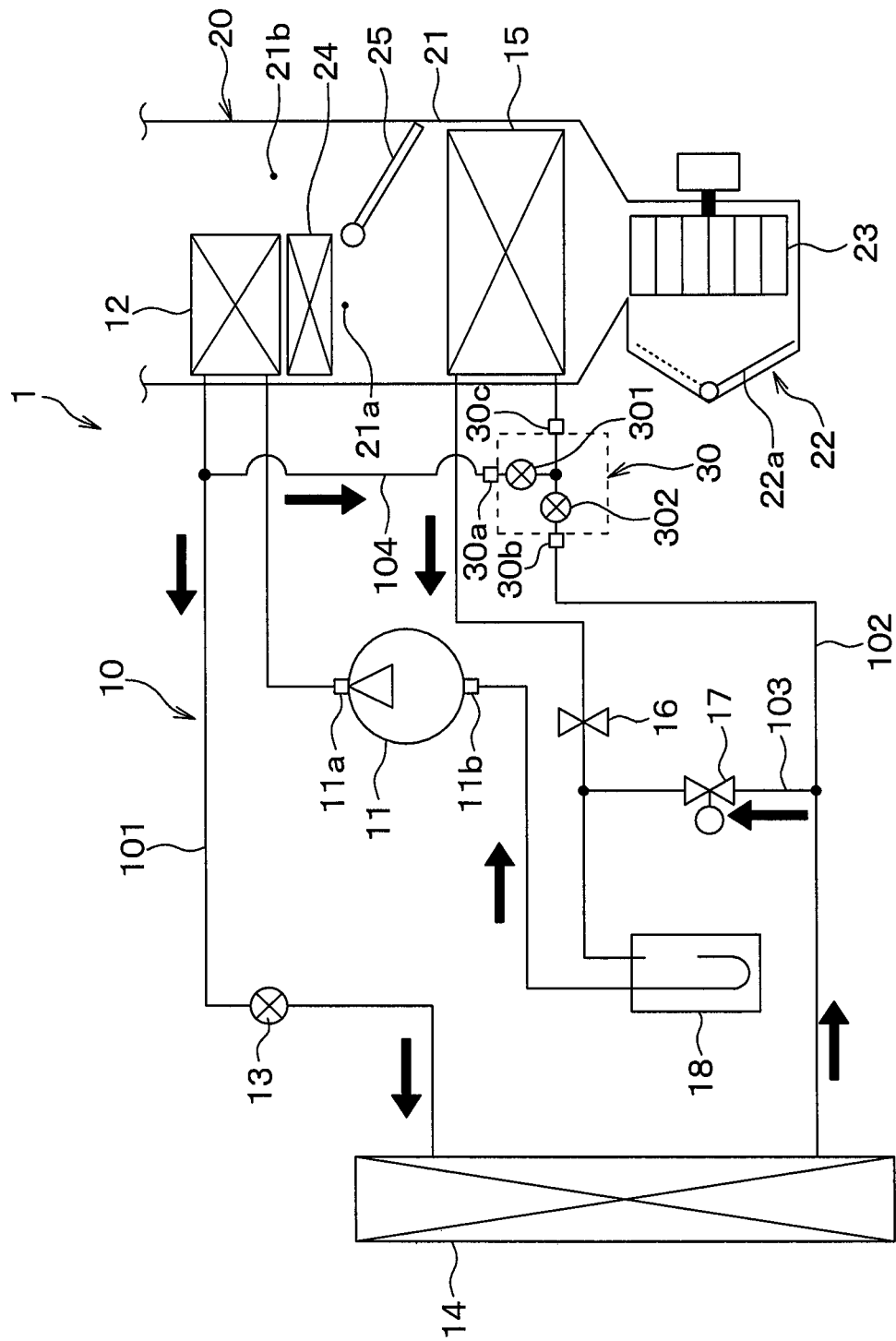
FIG. 3 it is an overall diagram of the vehicle airconditioner showing a flow of coolant in the refrigeration cycle at the time of a dehumidifying and heating operation.
Figure 4:
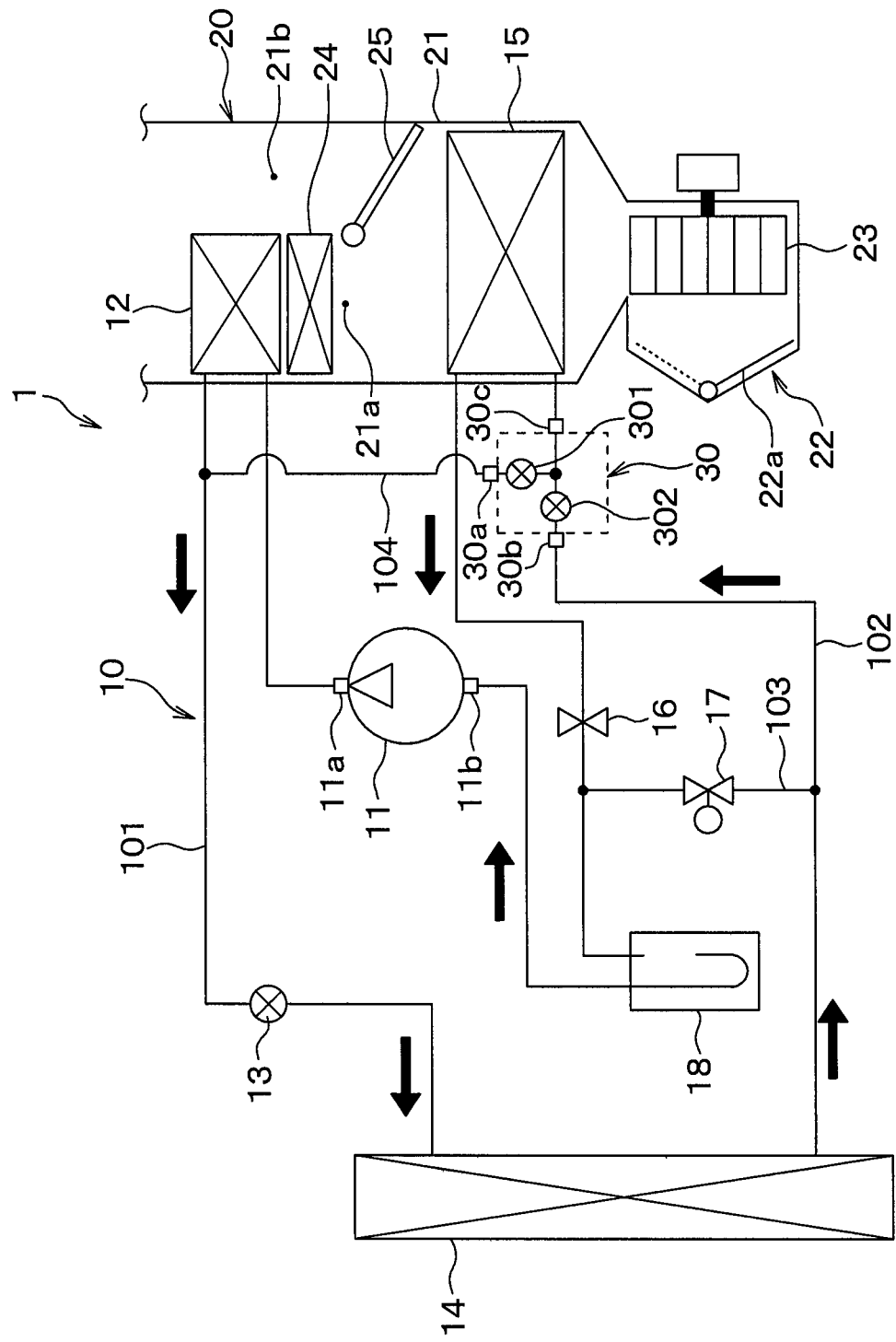
FIG. 4 it is an overall diagram of the vehicle airconditioner showing a flow of coolant in the refrigeration cycle at the time of a cooling operation.

Herein, FIG. 2 shows the refrigeration cycle 10 switched into the coolant circuit at the time of the heating operation. In addition, FIG. 3 shows the refrigeration cycle 10 switched into the coolant circuit at the time of the dehumidifying and heating operation. Furthermore, FIG. 4 shows the refrigeration cycle 10 switched into the coolant circuit at the time of the cooling operation. Bold arrows illustrated in FIGS. 2 to 4 represent a flow of the coolant at the time of each operation.

The refrigeration cycle 10 of the present embodiment includes the compressor 11, a condenser 12, an expansion valve 13, an outdoor heat exchanger 14, an evaporator 15, an evaporating pressure control valve 16, a valve 17, an accumulator 18, the integrated valve 30, and the like.

The compressor 11 is located in the engine room. The compressor 11 compresses coolant drawn from a coolant inlet port 11b and discharges the coolant from the coolant outlet port 11a. The compressor 11 of the present embodiment is configured as an electric compressor driven by an electric motor (not shown). The compressor 11 is configured to change a discharge capability (for example, an amount of discharge flow and a discharge pressure) of coolant according to a revolution of the electric motor. The operation of the electric motor of the compressor 11 is controlled according to a control signal sent from a control device 90 which will be described later.

A coolant inlet of the condenser 12 is connected to a coolant outlet port 11a of the compressor 11. The condenser 12 is located in an air-conditioning case 21 of the indoor air-conditioning unit 20. The condenser 12 is a radiator, which causes high-pressure coolant discharged from the compressor 11 to dissipate heat and thereby to heat air which has passed through the evaporator 15, which will be described later.

A coolant inlet of the expansion valve 13 is connected to a coolant outlet of the condenser 12 through a first coolant passage 101. The expansion valve 13 is a decompression mechanism to reduce pressure of coolant flowing out of the condenser 12. The expansion valve 13 includes a valve element, which is configured to change a throttle opening, and a driver actuator to drive the valve element.

The expansion valve 13 of the present embodiment includes a variable throttle mechanism configured to set a throttle state, in which a decompression operation is made, and a full-open state, in which the decompression operation is not made. Furthermore, the expansion valve 13 is configured with an electric type variable throttle mechanism, which is controlled by a control signal sent from the control device 90 which will be described later.

A coolant inlet of the outdoor heat exchanger 14 is connected to a coolant outlet of the expansion valve 13. The outdoor heat exchanger 14 is a heat exchanger, which is located in an engine room and is to perform heat exchange between coolant, which has passed through the expansion valve 13, and fresh air (namely, air outside the vehicle interior).

The outdoor heat exchanger 14 of the present embodiment functions as a heat absorbing heat exchanger, which evaporates coolant at the time of the heating operation and performs a heat absorbing operation. The outdoor heat exchanger 14 functions as a heat exchanger to cause the coolant to dissipate heat at least at the time of the cooling operation.

A second inlet hole 30b of the integrated valve 30 is connected with the coolant outlet of the outdoor heat exchanger 14 through a second coolant passage 102 and is connected with the valve 17 through a third coolant passage 103.

Herein, the refrigeration cycle 10 of the present embodiment is connected with a fourth coolant passage 104, which guides a part of coolant, which flows out of the condenser 12 into the first coolant passage 101, to the first inlet hole 30a of the integrated valve 30. The fourth coolant passage 104 is a coolant passage to cause coolant, which flows out of the condenser 12, to bypass the above-described expansion valve 13 and the outdoor heat exchanger 14 and to guide the coolant toward the integrated valve 30.

The integrated valve 30 is an integrated type electric flow control valve including two flow control portions 301 and 302 integrated with each other. The operation of the integrated valve 30 is controlled by the control signal sent from the control device 90 which will be described later.

Specifically, the integrated valve 30 includes the first flow control portion 301, which controls a flow quantity of coolant flowing from the first inlet hole 30a, and the second flow control portion 302, which controls a flow quantity of coolant flowing from the second inlet hole 30b. The integrated valve 30 is configured to set both the first flow control portion 301 and the second flow control portion 302 in a blockade state to blockade a coolant flow, i.e., in a full close state. In this way, the integrated valve 30 is configured to prohibit coolant, which flows from the first inlet hole 30a, and coolant, which flows from the second inlet hole 30b, from flowing out of an outlet hole 30c simultaneously. Details of the integrated valve 30 will be described later.

A coolant inlet of the evaporator 15 is connected to the outlet hole 30c of the integrated valve 30. The evaporator 15 is located at an airflow upstream of the condenser 12 in the air-conditioning case 21 of the indoor air-conditioning unit 20, which will be described later. The evaporator 15 is a heat exchanger to perform heat exchange between coolant, which flows out of the integrated valve 30, and blown air, which is an object fluid to be heat-exchanged, to evaporate the coolant and thereby to cool the blown air.

A coolant inlet of the evaporating pressure control valve 16 is connected to a coolant outlet of the evaporator 15. The evaporating pressure control valve 16 is provided on the upstream side with respect to a connection point, at which the third coolant passage 103 is connected, in a coolant passage, which is from a coolant outlet of the evaporator 15 to the accumulator 18.

The evaporating pressure control valve 16 is a mechanical decompression mechanism configured to reduce pressure of coolant, which flows out of the evaporator 15. More specifically, the evaporating pressure control valve 16 reduces pressure of coolant, which flows out of the evaporator 15, so that a coolant pressure at the coolant outlet of the evaporator 15 is maintained at a predetermined pressure. The coolant pressure of the inlet of the evaporating pressure control valve 16 is set to avoid frost of the evaporator 15.

The third coolant passage 103 is a coolant passage to cause coolant, which flows out of the outdoor heat exchanger 14, to bypass the above-described integrated valve 30 and the evaporator 15 and to guide the coolant to the accumulator 18. The valve 17 provided in the third coolant passage 103 is an electric valve which opens and closes the third coolant passage 103. The operation of the valve 17 is controlled by the control signal sent from the control device 90 which will be described later.

The accumulator 18 is a device to perform gas-liquid separation of coolant, which flows thereinto, and to accumulate the separated coolant as surplus coolant in the refrigeration cycle 10. The accumulator 18 also functions as a gas-liquid separation device to cause the separated vapor-phase refrigerant and lubricating oil, which is contained in the coolant, to flow into the coolant inlet port 11b of the compressor 11.

Subsequently, the indoor air-conditioning unit 20 will be described. The indoor air-conditioning unit 20 is located inside a foremost instrument board (namely, instrument panel) in the vehicle interior. The indoor air-conditioning unit 20 includes the air-conditioning case 21, which forms an outer shell and further forms an air passage therein for indoor blown air blown into the vehicle interior.

An inside air and outside air switching device 22 is located on the uppermost stream side of airflow in the air-conditioning case 21 to switch and draw inside air (namely, air in the vehicle interior) and outside air. The inside air and outside air switching device 22 includes an inside air and an outside air switching door 22a to control an opening areas of an inside air feed port, which is to feed an inside air into the air-conditioning case 21, and an outside air feed port, which is to feed outside air into the air-conditioning case 21.

A blower 23 is located at the downstream of the inside air and outside air switching device 22 with respect to airflow to feed air through the inside air and outside air switching device 22 and to blow the air into the vehicle interior. The blower 23 is an electric blower configured with a centrifugal multiblade fan (namely, sirocco fan) driven by an electric motor. The revolution of the blower 23 is controlled by the control signal sent from the control device 90, which will be described later.

The evaporator 15, the heater core 24, and the condenser 12 are located at the downstream of the blower 23 with respect to the airflow. The evaporator 15, the heater core 24, and the condenser 12 are arranged in the order of the evaporator 15→the heater core 24→the condenser 12 with respect to the flow of the blown air.

Herein, the heater core 24 is a heat exchanger for heating blown air by using waste heat of the internal combustion engine which generates a driving force for a vehicle traveling operation. Specifically, the heater core 24 is configured to perform heat exchange between the cooling water of the internal combustion engine and blown air thereby to heat the blown air.

The air-conditioning case 21 of the present embodiment defines, at the downstream of the evaporator 15 with respect to the airflow, a warm air passage 21a, in which the heater core 24 and the condenser 12 are located, and a bypass passage 21b, which guides air to bypass the warm air passage 21a.

An air mixing door 25 is located in the air-conditioning case 21 to control an airflow quantity flowing into the warm air passage 21a and an airflow quantity flowing into the bypass passage 21b within the blown air after passing through the evaporator 15. The operation of the air mixing door 25 is controlled by the control signal sent from the control device 90 which will be describes later.

An opening hole (not shown) is formed in the air-conditioning case 21 at the downmost stream with respect to the airflow to communicate with the vehicle interior, which is an object space to be air-conditioned. Air, which is controlled in temperature by the evaporator 15, the heater core 24, and the condenser 12, is blown through an opening hole (not shown) into the vehicle interior.

Subsequently, the control device 90, which is an electric control unit of the vehicle airconditioner 1, will be described. The control device 90 is configured with a generally-known microcomputer, which includes a CPU, a ROM, a RAM, and the like, and its peripheral circuit. A storage unit of the control device 90 is configured with a non-transitory tangible storage media.

The control device 90 performs various arithmetic calculations and processing according to a control program stored in the ROM and the like. The control device 90 controls the operations of controlled devices, which are connected with its output side, such as the compressor 11, the expansion valve 13, the integrated valve 30, the valve 17, the blower 23, the air mixing door 25 and the like.

Herein, the control device 90 is integrally configured with a control unit, which controls the operation of each of the controlled devices connected to its output side. For example, in the present embodiment, a configuration (for example, hardware and/or software) of the control device 90 to control the operation of the integrated valve 30 forms a drive control unit 90a. The drive control unit 90a may be configured a separate object from the control device 90.

Subsequently, the operation of the vehicle airconditioner 1 of the present embodiment will be described. The vehicle airconditioner 1 of the present embodiment is configured to switch among the heating operation, the dehumidifying and heating operation, and the cooling operation according to a control performed by the control device 90 for each controlled device. As follows, each of the heating operation, the dehumidifying and heating operation, and the cooling operation of the vehicle airconditioner 1 will be described.

Heating Operation

The control device 90 sets the valve 17 into an opening state to open the third coolant passage 103 when a condition to execute the heating operation is satisfied. In addition, the control device 90 sets the expansion valve 13 into a throttling state to reduce pressure of coolant, which flows out of the condenser 12, and thereafter to cause the coolant to flow into the outdoor heat exchanger 14. Furthermore, as shown in FIG. 5, the control device 90 sets both the first flow control portion 301 and the second flow control portion 302 of the integrated valve 30 at a full close state to close the second coolant passage 102 and the fourth coolant passage 104.

In this way, the refrigeration cycle 10 at the time of the heating operation forms the coolant circuit shown in FIG. 2. That is, the refrigeration cycle 10 forms a configuration in which coolant, which is discharged from the compressor 11, flows through the condenser 12, the expansion valve 13, the outdoor heat exchanger 14, the valve 17, and the accumulator 18, in this order, to be drawn again into the compressor 11.

In addition, the control device 90 controls the air mixing door 25 at a position to close the bypass passage 21b. In this way, the indoor air-conditioning unit 20 at the time of the heating operation forms a configuration in which the total flow of blown air after passing through the evaporator 15 passes through the warm air passage 21a.

In the vehicle airconditioner 1 shown in FIG. 2, high-temperature and high-pressure coolant, which is discharged from the compressor 11, flows into the condenser 12, and the condenser 12 causes the high-temperature and high-pressure coolant to dissipate heat to air which has passed through the heater core 24.

The coolant, which has passed through the condenser 12, is reduced in pressure through the expansion valve 13 and thereafter flows into the outdoor heat exchanger 14. Coolant flowing into the outdoor heat exchanger 14 absorbs heat from outside air to be evaporated and is again drawn into the compressor 11 through the valve 17 and the accumulator 18.

As described above, at the time of the heating operation, heat of high-temperature and high-pressure coolant in the refrigeration cycle 10 dissipates heat to air in the indoor air-conditioning unit 20 to heat blown air. Subsequently, the blown air, which is heated in the indoor air-conditioning unit 20, is blown into the vehicle interior. In this way, the vehicle airconditioner 1 performs heating in the vehicle interior.

Dehumidifying and Heating Operation

The control device 90 sets the valve 17 at the opening state to open the third coolant passage 103 when a condition to execute the dehumidifying and heating operation is satisfied. In addition, the control device 90 sets the expansion valve 13 into the throttling state to reduce pressure of coolant, which flows out of the condenser 12, and thereafter to cause the coolant to flow into the outdoor heat exchanger 14.

As shown in FIG. 5, the control device 90 sets the second flow control portion 302 of the integrated valve 30 at the full close state to close the second coolant passage 102. On the other hand, the control device 90 sets the first flow control portion 301 of the integrated valve 30 at a flow controlling state to control a throttle opening and opens the fourth coolant passage 104.

In this way, the refrigeration cycle 10 at the time of the heating operation forms the coolant circuit shown in FIG. 3. That is, the refrigeration cycle 10 in the dehumidifying and heating operation forms a configuration in which coolant, which is discharged from the compressor 11, flows through the condenser 12, the expansion valve 13, the outdoor heat exchanger 14, the valve 17, and the accumulator 18, in this order, to be drawn again into the compressor 11. At the time of the dehumidifying and heating operation, the fourth coolant passage 104 is open. Therefore, the refrigeration cycle 10 in the dehumidifying and heating operation forms a configuration in which a part of coolant, which is discharged from the condenser 12, flows through the first flow control portion 301, the evaporator 15, the evaporating pressure control valve 16, and the accumulator 18, in this order, to be drawn again into the compressor 11.

The control device 90 controls the air mixing door 25 at a position to open the warm air passage 21a. In this way, the indoor air-conditioning unit 20 at the time of the dehumidifying and heating operation forms a configuration in which at least a part of blown air, which has been dehumidified and cooled through the evaporator 15, passes though the warm air passage 21a.

In the vehicle airconditioner 1 shown in FIG. 5, high-temperature and high-pressure coolant, which is discharged from the compressor 11, flows into the condenser 12, and the condenser 12 causes the high-temperature and high-pressure coolant to dissipate heat to air which has passed through the heater core 24.

A part of coolant, which has passed through the condenser 12, is reduced in pressure through the expansion valve 13 and thereafter flows into the outdoor heat exchanger 14. Coolant flowing into the outdoor heat exchanger 14 absorbs heat from outside air to be evaporated and is again drawn into the compressor 11 through the valve 17 and the accumulator 18.

Remainder of coolant, which has passed through the condenser 12, is reduced in pressure through the first flow control portion 301 of the integrated valve 30 and thereafter flows into the evaporator 15. Coolant at low temperature and low pressure flows into the evaporator 15 and absorbs heat from blown air to be evaporated. The coolant is again drawn into the compressor 11 through the evaporating pressure control valve 16 and the accumulator 18.

Herein, moisture contained in the blown air, which flows into the evaporator 15, forms condensation on the surface of the evaporator 15 when passing through the evaporator 15. In this way, blown air, which has passed through the evaporator 15, becomes dry air in which a rate of moisture vapor contained in the air is low.

As described above, blown air is dehumidified by the evaporator 15 of the refrigeration cycle 10 at the time of the dehumidifying and heating operation. Thereafter, blown air is heated with heat of the high-temperature and high-pressure coolant in the refrigeration cycle 10 and is blown into the vehicle interior. In this way, the vehicle airconditioner 1 performs the dehumidifying and heating in the vehicle interior.

Cooling Operation

The control device 90 sets the valve 17 at the closing state to close the third coolant passage 103 when a condition to execute the cooling operation is satisfied. In addition, the control device 90 sets the expansion valve 13 at the full-open state to cause coolant, which flows out of the condenser 12, to flow into the outdoor heat exchanger 14 without being reduced in pressure.

As shown in FIG. 5, the control device 90 sets the first flow control portion 301 of the integrated valve 30 at the full close state to close the fourth coolant passage 104. On the other hand, the control device 90 sets the second flow control portion 302 of the integrated valve 30 at the flow controlling state to control the throttle opening and opens the second coolant passage 102.

In this way, the refrigeration cycle 10 at the time of the cooling operation forms the coolant circuit shown in FIG. 4. That is, coolant, which is discharged from the compressor 11, flows through the condenser 12, the expansion valve 13, the outdoor heat exchanger 14, the second flow control portion 302, the evaporator 15, the evaporating pressure control valve 16, and the accumulator 18, in this order, to be drawn again into the compressor 11.

In addition, the control device 90 controls the air mixing door 25 at a position to close the warm air passage 21a. In this way, the indoor air-conditioning unit 20 at the time of the cooling operation forms a configuration in which total flow of the blown air, which is cooled through the evaporator 15, passes through the bypass passage 21b.

In the vehicle airconditioner 1 shown in FIG. 3, high-temperature and high-pressure coolant, which is discharged from the compressor 11, flows into the condenser 12. Under the present state, the warm air passage 21a is closed by the air mixing door 25. Therefore, coolant does not perform heat exchange with air in the condenser 12 and flows into the expansion valve 13.

The expansion valve 13 is in the full-open state at the time of the cooling operation. Therefore, coolant, which flows into the expansion valve 13, flows into the outdoor heat exchanger 14 substantially without being reduced in pressure through the expansion valve 13. Coolant flowing into the outdoor heat exchanger 14 dissipates heat to outside air, and thereafter, the coolant is reduced in pressure through the second flow control portion 302 of the integrated valve 30.

The coolant reduced in pressure through the second flow control portion 302 flows into the evaporator 15 and absorbs heat from blown air to be evaporated. In this way, blown air is cooled. The coolant, which flows out of the evaporator 15, is again drawn by the compressor 11 through the evaporating pressure control valve 16 and the accumulator 18.

As described above, at the time of the cooling operation, blown air is cooled though the evaporator 15 of the refrigeration cycle 10, and thereafter, the air is blown into the vehicle interior, without performing heat exchange with the high-temperature and high-pressure coolant in the refrigeration cycle 10. In this way, the vehicle airconditioner 1 performs cooling in the vehicle interior.

Figure 6:
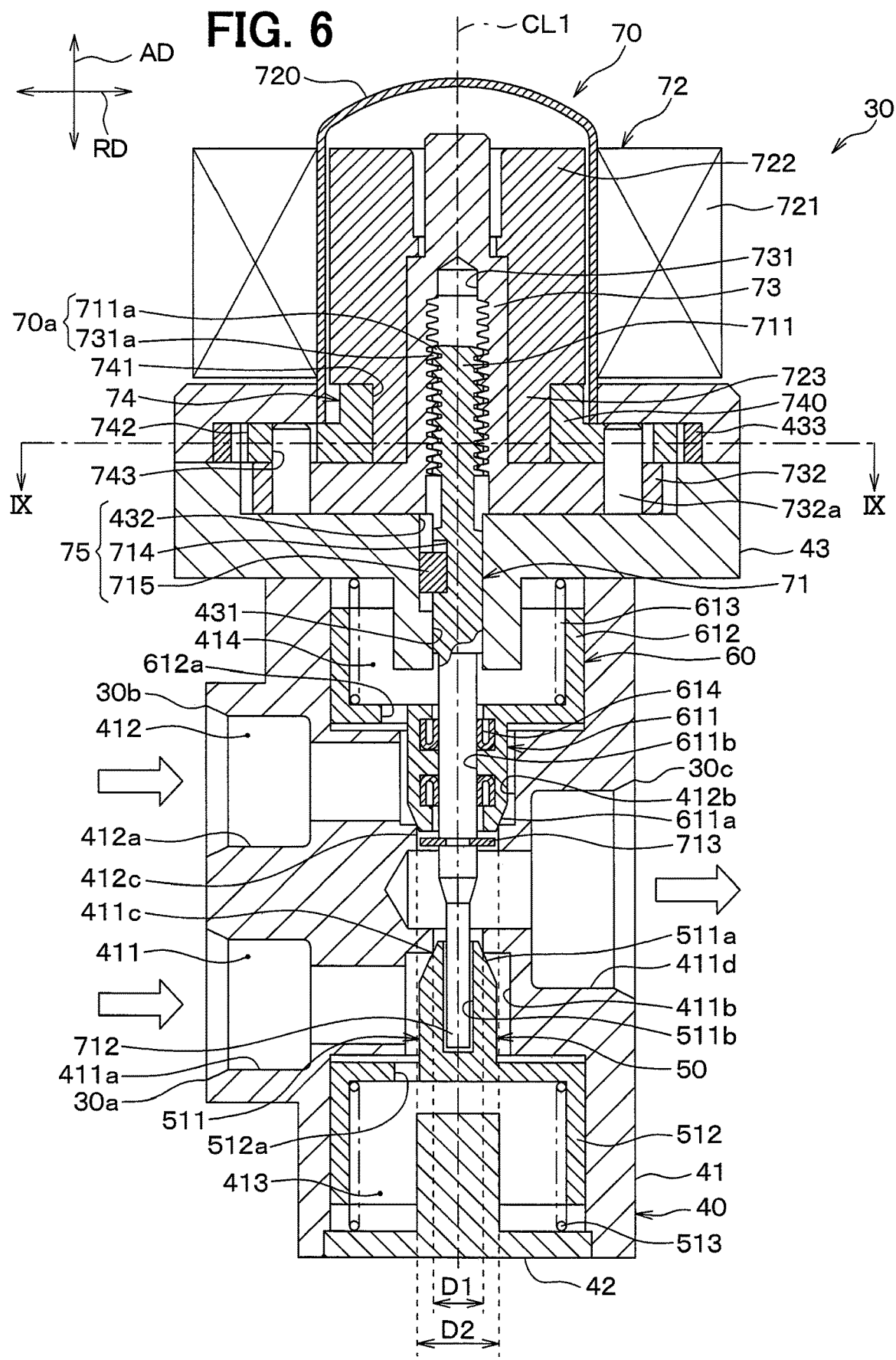
FIG. 6 it is a sectional view of the integrated valve taken along the axial direction according to the first embodiment.

Subsequently, details of the integrated valve 30 will be described with reference to FIGS. 6 to 10. FIG. 6 is a sectional view showing the integrated valve 30 taken along a section including a valve shaft center CL1, which is a center axis of each of the valve elements 50 and 60 of the integrated valve 30 of the present embodiment. In FIG. 6, a direction extending along the valve shaft center CL1 is an axial direction AD, and a direction perpendicular to the valve shaft center CL1 is a radial direction RD. This is the same also in the drawings subsequent to FIG. 6.

As shown in FIG. 6, the integrated valve 30 includes, as main elements, a housing 40, a first valve element 50, a second valve element 60, and an actuator 70, which is an actuator.

The housing 40 includes a passage defining portion 41, a blockade portion 42, and a connecting portion 43. In the housing 40, the blockade portion 42, the passage defining portion 41, and the connecting portion 43 are arranged in this order along the axial direction AD of the valve shaft center CL1. That is, the passage defining portion 41 is located between the blockade portion 42 and the connecting portion 43 in the axial direction AD. Coolant flows inside the passage defining portion 41. Therefore, the passage defining portion 41 is connected with both the blockade portion 42 and the connecting portion 43 air-tightly and liquid-tightly.

The passage defining portion 41 is formed of a metallic material in a block form excellent in resistance to heat and resistance to pressure. The first inlet hole 30a and the second inlet hole 30b, the outlet hole 30c, a first fluid passage 411, a second fluid passage 412, the first valve accommodating portion 413, and the second valve accommodating portion 414 are formed in the passage defining portion 41.

The first inlet hole 30a is an opening portion to feed coolant from the outside. The first inlet hole 30a opens in the radial direction RD. The fourth coolant passage 104 is connected with the first inlet hole 30a via a connection member such as a tube fitting. In this way, coolant flowing out of the condenser 12 in the refrigeration cycle 10 flows into the first inlet hole 30a.

The second inlet hole 30b is an opening portion to feed coolant from the outside. The second inlet hole 30b opens in the radial direction RD in the same direction as that of the first inlet hole 30a. The second inlet hole 30b opens at a position shifted relative to the first inlet hole 30a in the axial direction AD. The second coolant passage 102 is connected with the second inlet hole 30b via a connection member such as a tube fitting. In this way, coolant flowing out of the outdoor heat exchanger 14 in the refrigeration cycle 10 flows into the second inlet hole 30b.

The outlet hole 30c opens in the radial direction RD in the opposite direction of those of the first inlet hole 30a and the second inlet hole 30b. The outlet hole 30c opens between the first inlet hole 30a and the second inlet hole 30b in the axial direction AD. A pipe is connected with the outlet hole 30c via a connection member, such as tube fitting, to connect the outlet hole 30c with the coolant inlet of the evaporator 15.

In this way, coolant in the passage defining portion 41 flows out of the outlet hole 30c toward the evaporator 15.

The first fluid passage 411 is a passage formed in the passage defining portion 41 to guide coolant flowing from the first inlet hole 30a to the outlet hole 30c. The first fluid passage 411 has a first introducing passage 411a, a first intermediate passage 411b, and an outlet passage 411d. The first introducing passage 411a is formed as a bottomed hole extending from the first inlet hole 30a along the radial direction RD. The first intermediate passage 411b is a communication passage communicating with the first introducing passage 411a. The first intermediate passage 411b is formed as a through hole centered about the valve shaft center CL1 and extending along the axial direction AD. The outlet passage 411d is a communication passage communicating with the first intermediate passage 411b. The outlet passage 411d is formed as a bottomed hole extending from the outlet hole 30c along the radial direction RD.

A first valve seat portion 411c, on which a seal portion 511a of the first valve element 50 is seated, is formed in the first intermediate passage 411b. The first valve seat portion 411c of the present embodiment is formed as an opening periphery portion opening in a circle shape and connecting the first introducing passage 411a with the outlet passage 411d.

The second fluid passage 412 is a passage formed in the passage defining portion 41. The second fluid passage 412 guides coolant flowing from the second inlet hole 30b toward the outlet hole 30c. The second fluid passage 412 has a second introducing passage 412a, a second intermediate passage 412b, and the outlet passage 411d. The second introducing passage 412a is formed as a bottomed hole extending from the second inlet hole 30b along the radial direction RD. The second intermediate passage 412b is a communication passage communicating with the second introducing passage 412a and the outlet passage 411d. The second intermediate passage 412b is formed as a through hole centered about the valve shaft center CL1 and extending along the axial direction AD.

A second valve seat portion 412c, on which a seal portion 611a of the second valve element 60 is seated, is formed in the second intermediate passage 412b. The second valve seat portion 412c of the present embodiment is formed as an opening periphery portion opening in a circle shape and connecting the second introducing passage 412a with the outlet passage 411d.

Herein, a part of coolant flowing out of the condenser 12 in the refrigeration cycle 10 flows into the first inlet hole 30a. Entirety of coolant flowing out of the outdoor heat exchanger 14 in the refrigeration cycle 10 flows into the second inlet hole 30b. That is, in the refrigeration cycle 10 of the present embodiment, a flow quantity of coolant, which flows through the first fluid passage 411 when the first fluid passage 411 is full open, becomes less than a flow quantity of coolant, which flows through the second fluid passage 412 when the second fluid passage 412 is full open. Accordingly, higher accuracy is required to a flow quantity control of coolant in the first fluid passage 411 compared with the second fluid passage 412.

Therefore, in the present embodiment, the diameter D1 of the opening of the first valve seat portion 411c is set smaller than the diameter D2 of the opening of the second valve seat portion 412c. It is noted that, equivalent values may be obtained by converting the openings of the valve seat portions 411c and 412c into the diameters of equivalent circles and may be used as the diameter D1 of the opening of the first valve seat portion 411c and the diameter D2 of the opening of the second valve seat portion 412c.

Subsequently, the first valve accommodating portion 413 is a portion which forms a space accommodating a first valve support portion 512 of the first valve element 50, which will be described later. The first valve accommodating portion 413 is formed as a hole defined in an end of the passage defining portion 41 in the axial direction AD. The first valve accommodating portion 413 communicates with the first intermediate passage 411b so that a first valve element portion 511 of the first valve element 50 can be projected into the first intermediate passage 411b.

The second valve accommodating portion 414 is a portion which forms a space accommodating a second valve support portion 612 of the second valve element 60, which will be described later. The second valve accommodating portion 414 is formed as a hole formed on the opposite side of the first valve accommodating portion 413 in the axial direction AD. The second valve accommodating portion 414 communicates with the second intermediate passage 412b so that a second valve element portion 611 of the second valve element 60 can be projected into the second intermediate passage 412b.

Subsequently, the blockade portion 42 is a member forming the housing 40 and blockading the space formed in the first valve accommodating portion 413. The blockade portion 42 is joined with the passage defining portion 41 to be air-tight and liquid-tight with the passage defining portion 41.

The connecting portion 43, which forms the housing 40, is a member blockading a space formed in the second valve accommodating portion 414 and connecting the actuator 70, which will be described later, with the housing 40.

A through hole 431 centered about the valve shaft center CL1 is formed in the connecting portion 43 to extend along the axial direction AD. The through hole 431 is formed to project a part of a rod 71 of the actuator 70, which will be described later, into the housing 40.

The inner circumferential periphery of the through hole 431 of the connecting portion 43 is opposed to the outer circumferential periphery portion of the rod 71. A housing groove portion 432, which forms a rotation prevention mechanism 75 to be described later, is formed in the inner circumferential periphery of the through hole 431 of the connecting portion 43. The housing groove portion 432 is formed to extend in the connecting portion 43 along the axial direction AD relative to the inner circumferential periphery of the through hole 431, which is opposed to the rod 71 of the actuator 70, which will be described later.

An internal gear 433, which is formed with multiple arc-shaped inner teeth, is equipped to a portion of the connecting portion 43 to which the actuator 70 is connected. Details of the internal gear 433 in the connecting portion 43 will be described later.

The first valve element 50 is opposed to the first valve seat portion 411c, which is formed in the passage defining portion 41. The first valve element 50 is a member to close the first fluid passage 411, when being in contact with the first valve seat portion 411c, and to open the first fluid passage 411 when being spaced from the first valve seat portion 411c. The first valve element 50 of the present embodiment has the first valve element portion 511, the first valve support portion 512, and a first biasing member 513.

The first valve element portion 511 is formed of a shaft-shaped member. The first valve element portion 511 is located in the first intermediate passage 411b so that its center coincides with the valve shaft center CL1.

The first valve element portion 511 is formed with the seal portion 511a at an outer portion, which is opposed to the first valve seat portion 411c. The seal portion 511a makes contact with the first valve seat portion 411c when closing the first fluid passage 411. The seal portion 511a is in a tapered shape to become thinner toward the first valve seat portion 411c in the axial direction AD.

A rod receiving portion 511b is formed in the first valve element portion 511 at a tip end on the side of the first valve seat portion 411c. The rod receiving portion 511b receives a first urging portion 712 equipped to the rod 71 of the actuator 70, which will be described later. The rod receiving portion 511b is formed as a bottomed hole centered about the valve shaft center CL1 and extending along the axial direction AD. The rod receiving portion 511b is greater in outer diameter than the first urging portion 712 of the rod 71.

The seal portion 511a of the first valve element portion 511 makes contact with the first valve seat portion 411c thereby to blockade the first fluid passage 411. The throttle opening of the first fluid passage 411 becomes greater as the seal portion 511a of the first valve element portion 511 is spaced from the first valve seat portion 411c. That is, the passage sectional area of the first fluid passage 411 becomes greater as the seal portion 511a of the first valve element portion 511 is spaced from the first valve seat portion 411c. The passage sectional area of the first fluid passage 411 is an area of a cross section perpendicular to the flow of coolant. The passage sectional area of the first fluid passage 411 is an effective passage sectional area for drawing coolant.

The first valve support portion 512 is a guide member accommodated in the first valve accommodating portion 413 to support the first valve element portion 511 so that the first valve element portion 511 is displaceable in the axial direction AD. The first valve support portion 512 of the present embodiment is connected with a portion of the first valve element portion 511 on the opposite side of the seal portion 511a.

A pressure equalizing passage 512a is formed in the first valve support portion 512. The pressure equalizing passage 512a is a coolant passage for drawing coolant, which flows through the first fluid passage 411, into the first valve accommodating portion 413 to equalize pressure of coolant, which acts on the first valve element portion 511, to pressure of coolant, which acts on the first valve support portion 512.

The first biasing member 513 is a biasing member, such as a coil spring, accommodated in the first valve accommodating portion 413 to bias the first valve element portion 511 and the first valve support portion 512 thereby to blockade the first fluid passage 411.

The first biasing member 513 of the present embodiment is arranged so that a biasing force, which biases the seal portion 511a of the first valve element portion 511 in a direction to approach the first valve seat portion 411c, acts on the first valve element 50. Specifically, the first biasing member 513 is arranged so that the biasing force acts also when the seal portion 511a of the first valve element portion 511 is in contact with the first valve seat portion 411c.

The second valve element 60 is a member opposed to the second valve seat portion 412c, which is formed in the passage defining portion 41. The second valve element 60 closes the second fluid passage 412, when making contact with the second valve seat portion 412c, and opens the second fluid passage 412, when being spaced from the second valve seat portion 412c.

The second valve element 60 is located in the housing 40 to be coaxial with the above-described first valve element 50. The second valve element 60 of the present embodiment has the second valve element portion 611, the second valve support portion 612, and a second biasing member 613.

The second valve element portion 611 is formed of a shaft-shaped member and is located in the second intermediate passage 412b so that its center coincides with the valve shaft center CL1.

The second valve element portion 611 is formed with the seal portion 611a at its outer portion, which is opposed to the second valve seat portion 412c. The second valve element portion 611 makes contact with the second valve seat portion 412c when closing the second fluid passage 412. The seal portion 611a is in a tapered shape, which becomes thinner toward the second valve seat portion 412c in the axial direction AD.

A rod penetrating portion 611b is formed in the second valve element portion 611 to receive the rod 71 of the actuator 70, which will be described later. The rod penetrating portion 611b is formed as a through hole centered about the valve shaft center CL1 and extending along the axial direction AD. The rod penetrating portion 611b is greater in outer diameter than the rod 71. A seal member 614 is equipped in the rod penetrating portion 611b. The seal member 614 is formed of an O-ring and the like to reduce leakage of coolant through a clearance formed between the rod 71 and the rod penetrating portion 611b.

The seal portion 611a of the second valve element portion 611 makes contact with the second valve seat portion 412c thereby to blockade the second fluid passage 412. A throttle opening of the second fluid passage 412 becomes greater as the seal portion 611a of the second valve element portion 611 is spaced from the second valve seat portion 412c. That is, the passage sectional area of the second fluid passage 412 becomes greater as the distance of the seal portion 611a of the second valve element portion 611 from the second valve seat portion 412c becomes greater. The passage sectional area of the second fluid passage 412 is an area of the cross-section perpendicular to the flow of coolant and is a passage sectional area effective for drawing coolant.

The second valve support portion 612 is a guide member accommodated in the second valve accommodating portion 414 to support the second valve element portion 611 so that the second valve element portion 611 is displaceable in the axial direction AD. The second valve support portion 612 of the present embodiment is connected with a portion of the second valve element portion 611 on the opposite side of the seal portion 611a.

A pressure equalizing passage 612a is formed in the second valve support portion 612. The pressure equalizing passage 612a is a coolant passage to feed coolant, which flows through the second fluid passage 412, into the second valve accommodating portion 414 to equalize pressure of coolant, which acts on the second valve element portion 611, to pressure of coolant, which acts on the second valve support portion 612.

The second biasing member 613 is a biasing member, such as a coil spring accommodated in the second valve accommodating portion 414. The second biasing member 613 biases the second valve element portion 611 and the second valve support portion 612 to blockade the second fluid passage 412.

The second biasing member 613 of the present embodiment is arranged so that a biasing force, which biases the seal portion 611a of the second valve element portion 611 in the direction to approach the second valve seat portion 412c, acts on the second valve element 60. Specifically, the second biasing member 613 is arranged so that the biasing force acts also when the seal portion 611a of the second valve element portion 611 is in contact with the second valve seat portion 412c.

The actuator 70 is configured with a direct acting type actuator, which converts a rotary motion into a linear motion (that is, sliding motion) and outputs the motion. The integrated valve 30 of the present embodiment has a configuration to cause the actuator 70 to displace the first valve element 50 and the second valve element 60 in the axial direction of the rod 71. The actuator 70 of the present embodiment displaces the first valve element 50 and the second valve element 60 in a range where being in a first valve element control region, where being in a second valve element control region, and where being in a both valve full close region. The first valve element control region is an operating region where the first fluid passage 411 is opened to control a flow quantity of fluid through the first fluid passage 411 in a condition where the second fluid passage 412 is closed. The second valve element control region of is an operating region where the second fluid passage 412 is opened to control a flow quantity of fluid through the second fluid passage 412 in a condition where the first fluid passage 411 is closed. Furthermore, the both valve full close region is an operating region where both the first fluid passage 411 and the second fluid passage 412 are closed.

The actuator 70 of the present embodiment includes, as main components, the rod 71, an electric motor 72, an output shaft 73, a deceleration mechanism 74, and the rotation prevention mechanism 75.

The rod 71 is a member to move in the axial direction AD thereby to displace the first valve element 50 and the second valve element 60 in the axial direction AD. The rod 71 is formed of a bar-shaped member extending along the axial direction AD and is arranged so that its center coincides with valve shaft center CL1. The rod 71 is arranged to penetrate through both the first intermediate passage 411b and the second intermediate passage 412b.

A male thread 711a is formed on the rod 71 at a portion, which is on the side of tip end relative to a portion where the rod 71 penetrates the through hole 431 of the connecting portion 43. That is, the male thread 711a is formed on an output side end 711 opposed to the inner circumferential periphery of the output shaft 73, which will be described later. The male thread 711a forms a male screw portion, which meshes with a female thread 731a, which is formed in the rod receiving hole 731 of the output shaft 73, which will be described later.

The rod 71 is formed with the first urging portion 712 at end, which is on the opposite side of the output side end 711 in the axial direction AD, to urge the first valve element 50. The first urging portion 712 is a portion to act an urging force, which is against a biasing force of the first biasing member 513, onto the first valve element 50.

The rod 71 is equipped with a second urging portion 713 between the output side end 711 and the first urging portion 712 in the axial direction AD to urge the second valve element 60. Specifically, the second urging portion 713 is equipped between a portion of the rod 71, which is opposed to the rod penetrating portion 611b of the second valve element portion 611, and a portion, which is opposed to the rod receiving portion 511b of the first valve element portion 511.

The second urging portion 713 is a portion to act an urging force, which is against the biasing force of the second biasing member 613, on the second valve element 60. The second urging portion 713 is formed in a disc shape to project in the radial direction RD of the rod 71.

Furthermore, a rod groove portion 714 is formed at a portion of an outer circumferential periphery portion of the rod 71, which is opposed to the housing groove portion 432. The rod groove portion 714 is formed to extend in the outer periphery of the rod 71 along the axial direction AD.

A rotation regulating member 715 is located in a space formed between the housing groove portion 432 and the rod groove portion 714. In the present embodiment, the housing groove portion 432, the rod groove portion 714, and the rotation regulating member 715 form the rotation prevention mechanism 75 to regulate rotation of the rod 71 caused by a rotational driving force of the electric motor 72.

Figure 7:
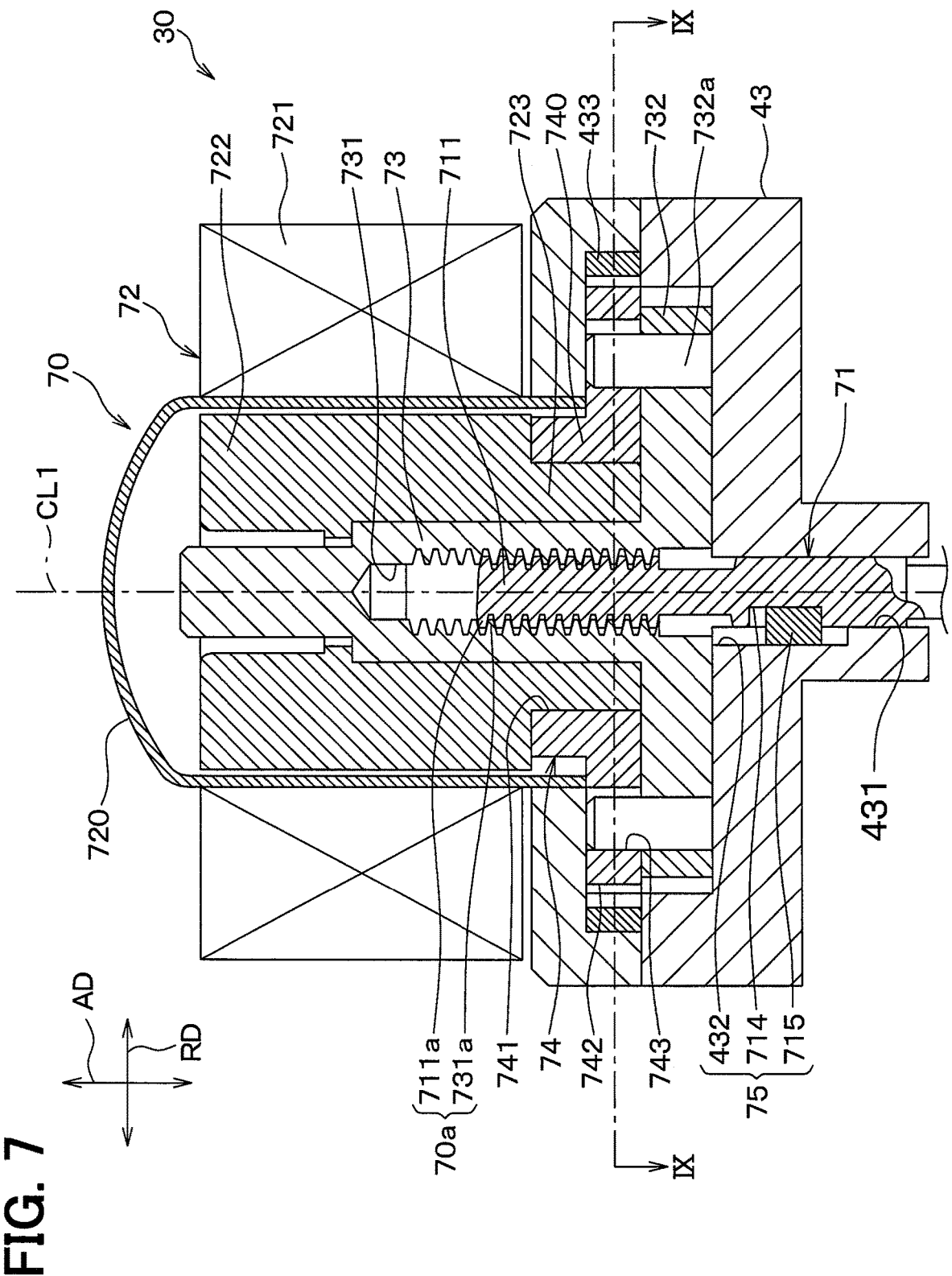
FIG. 7 it is a sectional view showing a main portion of the integrated valve taken along the axial direction according to the first embodiment.

The electric motor 72 is a device to generate a rotational driving force on supply of electricity. As shown in FIG. 7, the electric motor 72 is connected with the connecting portion 43 of the housing 40. The electric motor 72 of the present embodiment is formed of a stepping motor, which controls a rotational angle according to an input signal (for example, pulse signal). The electric motor 72 includes a cover 720, a stator 721, and a rotor 722 as main elements.

The cover 720 is a member surrounding the rotor 722 and is joined air-tightly and liquid-tightly with the connecting portion 43 of the housing 40. The cover 720 is formed to have a U-shaped cross section taken along the axial direction AD.

The stator 721 is a member formed of multiple coils (not shown) to generate a rotational magnetic field applied to the rotor 722. The stator 721 has a configuration supplied with electricity via a wiring (not shown).

Herein, in a case where the stator 721 is equipped inside the cover 720, it is necessary to form a hole and the like in the cover 720 to lead the wiring to supply electricity to the stator 721. Forming a hole in the cover 720 becomes a factor to reduce a sealing performance of the cover 720 and is not desirable.

Therefore, in the present embodiment, the stator 721 is arranged to surround the outer circumferential periphery of the cover 720. That is, in the electric motor 72 of the present embodiment, the stator 721 is located outside the cover 720, which accommodates the rotor 722 in a sealed state.

The rotor 722 is an annular member rotational in synchronization with the rotational magnetic field generated by the stator 721. The rotor 722 is located inside the cover 720. The rotor 722 is equipped with an eccentric shaft 723 at an end on the side of the connecting portion 43. The eccentric shaft 723 is eccentric relative to valve shaft center CL1.

Figure 8:
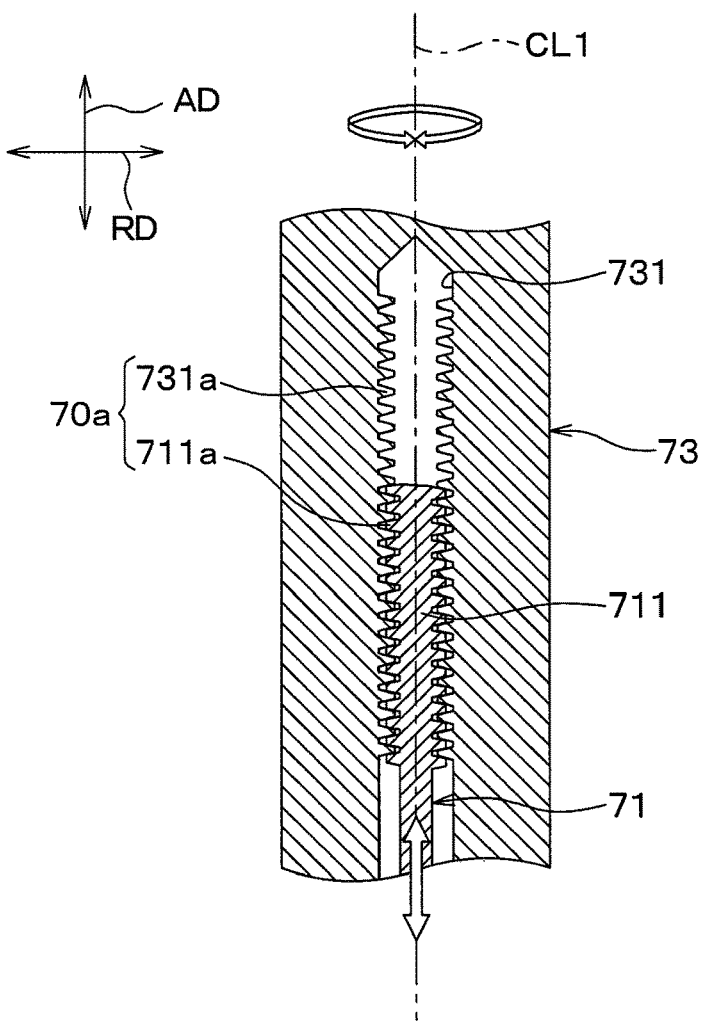
FIG. 8 it is a sectional view showing a main portion of the integrated valve taken along the axial direction according to the first embodiment.

The output shaft 73 is a member to output of the rotational driving force of the electric motor 72 to the rod 71. As shown in FIG. 8, a rod receiving hole 731 is formed in the output shaft 73 to receive the output side end 711 of the rod 71.

The rod receiving hole 731 is formed as a bottomed hole extending along the valve shaft center CL1. The female thread 731a is formed in the rod receiving hole 731. The female thread 731a of the present embodiment forms a female screw portion, which meshes with the male thread 711a formed on the output side end 711 of the rod 71.

A portion of the output shaft 73, which is formed with the rod receiving hole 731, is arranged inside the rotor 722 so that at least a part of the female thread 731a is located inside the rotor 722. That is, the female thread 731a is formed in a portion of the output shaft 73 located inside the rotor 722.

Herein, the male thread 711a of the rod 71 and the female thread 731a of the output shaft 73 mesh with each other, thereby to move the rod 71 of the present embodiment in the axial direction AD when the output shaft 73 rotates. In the present embodiment, the male thread 711a of the rod 71 and the female thread 731a of the output shaft 73 form a feed screw mechanism 70a, which converts the rotational driving force of the electric motor 72 into a thrust force of the rod 71 in the axial direction.

In the actuator 70 of the present embodiment, the feed screw mechanism 70a is formed inside the rotor 722 of the electric motor 72. The actuator 70 of the present embodiment has an arrangement configuration in which the feed screw mechanism 70a and the electric motor 72 do not overlap in the axial direction AD.

As shown in FIGS. 6 and 7, the output shaft 73 has a configuration connected with the eccentric shaft 723 of the rotor 722 via a deceleration gear 740. The output shaft 73 of the present embodiment is formed with a flange portion 732, which is in a disc shape extending in the radial direction RD, at an end on the side of the connecting portion 43 in the axial direction AD. The flange portion 732 is formed with multiple rotation transmission pins 732a, which are projected to the opposite side of the connecting portion 43 in the axial direction AD and are arranged along the circumferential direction.

The rotation transmission pins 732a of the present embodiment are arranged on the outside of the rotor 722 not to overlap with the rotor 722 in the axial direction AD of the rod 71. Specifically, the rotation transmission pins 732a of the present embodiment are arranged to overlap with the eccentric shaft 723 of the rotor 722 in the radial direction RD of the rod 71.

The deceleration gear 740 is a member, which forms the deceleration mechanism 74 together with the internal gear 433 of the connecting portion 43 to decelerate a rotational output of the electric motor 72 and to transmit the output to the output shaft 73.

The deceleration mechanism 74 of the present embodiment is configured to include the internal gear 433, which is formed inside a portion of the housing 40 surrounding the outer circumferential periphery of the rotor 722, and an external gear 742, which is formed with multiple outer teeth on the radially outside meshed with the inner teeth of the internal gear 433.

The actuator 70 of the present embodiment has an arrangement configuration in which the deceleration mechanism 74 is arranged on the outside of the rotor 722 of the electric motor 72 and in which the deceleration mechanism 74 and the electric motor 72 do not overlap in the axial direction AD.

Specifically, the external gear 742 of the deceleration mechanism 74 is configured with a gear having an outer diameter greater than the rotor 722 and having an inner diameter greater than the outer diameter of the eccentric shaft 723 of the rotor 722.

In this way, in the actuator 70 of the present embodiment, the female thread 731a of the output shaft 73, the eccentric shaft 723 of the rotor 722, the internal gear 433 and the external gear 742 of the deceleration mechanism 74 are arranged to overlap with each other in the radial direction RD of the rod 71.

Figure 9:
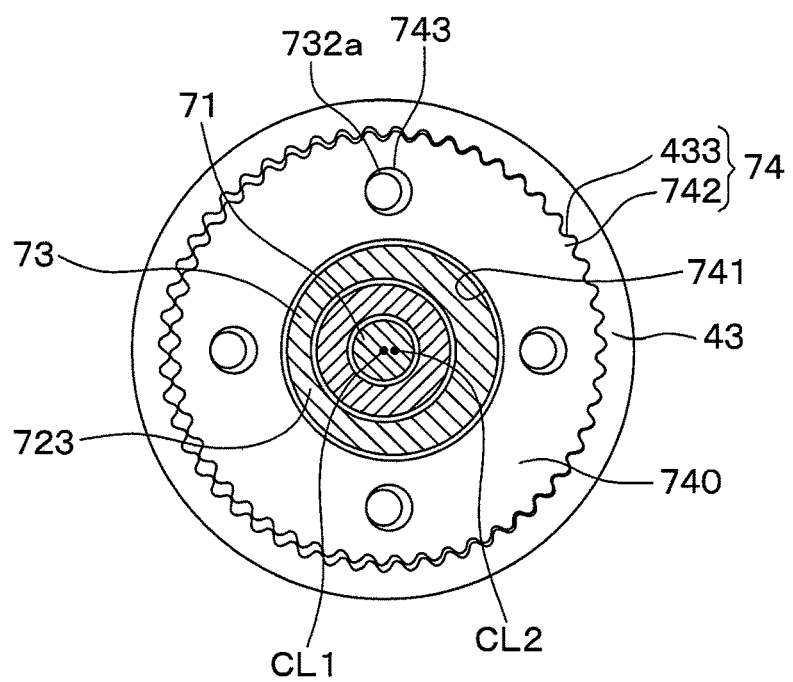
FIG. 9 it is a IX-IX sectional view of FIG. 6.

As shown in FIG. 9, the deceleration gear 740 is formed with a through hole 741, which is at a center of the shaft line CL2 of the eccentric shaft 723, into which the eccentric shaft 723 is fitted. The deceleration gear 740 is equipped with the external gear 742 formed with multiple arc-shaped outer teeth on its outside. The external gear 742 and the internal gear 433 of the present embodiment have teeth profiles in cycloid curves, respectively, so that the external gear 742 and the internal gear 433 are configured to mesh with each other.

The external gear 742 of the present embodiment is configured with the outer teeth having a number of teeth, which is less than the number of teeth of the internal gear 433 by one. The deceleration gear 740 is formed with pin holes 743, which have a diameter greater than the outer diameter of the rotation transmission pins 732a, at portions corresponding to the rotation transmission pins 732a. A rotational component of the deceleration gear 740 is transmitted to the output shaft 73 via the rotation transmission pins 732a, which are fitted to the pin holes 743.

Herein, as shown in FIG. 1, the first flow control portion 301 of the integrated valve 30 is configured with the first fluid passage 411 of the passage defining portion 41, the first valve element 50, and the actuator 70. The second flow control portion 302 is configured with the second fluid passage 412 of the passage defining portion 41, the second valve element 60, and the actuator 70. Therefore, the integrated valve 30 of the present embodiment has a configuration in which the first flow control portion 301 and the second flow control portion 302 commonly share the actuator 70.

Subsequently, an operation of the integrated valve 30 will be described. In the integrated valve 30, the rod 71 moves in the axial direction AD by the rotational driving force of the electric motor 72 of the actuator 70 thereby to displace the first valve element 50 and the second valve element 60.

Specifically, when the stator 721 of the electric motor 72 is energized, the stator 721 generates the rotational magnetic field to rotate the rotor 722 by a predetermined angle. At this time, the eccentric shaft 723 of the rotor 722 revolves around the valve shaft center CL1.

The deceleration gear 740, which is connected to the eccentric shaft 723 of the rotor 722, revolves with the eccentric shaft 723 around the valve shaft center CL1 in a condition where the external gear 742 is meshed with the internal gear 433 of the connecting portion 43.

In the present embodiment, the number of teeth of the external gear 742 is less than the number of teeth of the internal gear 433. Specifically, in the present embodiment, the number of teeth of the external gear 742 is less than the number of teeth of the internal gear 433 by one. The internal gear 433 is a fixed gear provided to the connecting portion 43.

Therefore, the deceleration gear 740 not only revolves, but also rotates while decelerating the rotational output of the rotor 722 significantly. That is, the external gear 742 of the deceleration gear 740 rotates according to the difference between the number of the inner teeth and the number of the outer teeth when revolving in synchronization with the eccentric portion 723 of the rotor 722. The rotational component of the deceleration gear 740 is transmitted to the output shaft 73 via the rotation transmission pins 732a thereby to rotate the output shaft 73.

Furthermore, the female thread 731a of the output shaft 73 and the male thread 711a of the rod 71 mesh with each other with rotation of the output shaft 73 thereby to move the rod 71 in the axial direction AD. At this time, the rod 71 moves in the axial direction AD without rotating, since rotation of the rod 71 is restricted by the rotation prevention mechanism 75.

Figure 10:
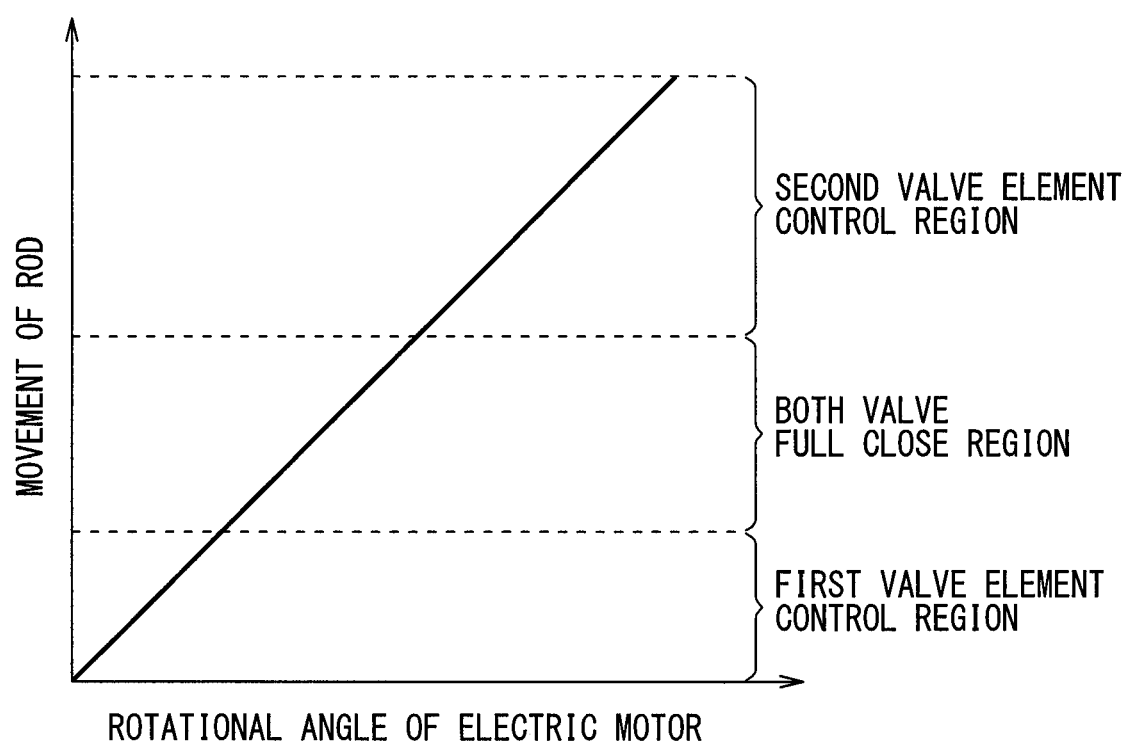
FIG. 10 it is a view showing an amount of movement of a rod with respect to a rotational angle of an electric motor of the integrated valve according to the first embodiment.

As shown in FIG. 10, the integrated valve 30 of the present embodiment is configured to change an amount of movement of the rod 71 with respect to the rotational angle of the electric motor 72 thereby to enable to set the rod 71 in a range of the first valve element control region, in a range of the second valve element control region, or in a range of the both valve full close region. In FIG. 10, a reference position is defined as a position of the rod 71, at which the rod 71 fully opens the first fluid passage 411, and the distance from the reference position is defined as the amount of movement of the rod 71.

Herein, in the range of the first valve element control region, the rod 71 moves from a position shown in FIG. 6 in the direction to approach the blockade portion 42 thereby to cause the first urging portion 712 of the rod 71 to make contact with the first valve element 50. Furthermore, the urging force acts onto the first valve element 50 against the biasing force of the first biasing member 513. In this way, the seal portion 511*a* of the first valve element portion 511 is spaced from the first valve seat portion 411*c*, and the first fluid passage 411 is opened.

In the range of the first valve element control region, the second urging portion 713 of the rod 71 is spaced from the second valve element 60. Therefore, the urging force, which is against the biasing force of the second biasing member 613, does not act onto the second valve element 60. In this way, the seal portion 611*a* of the second valve element portion 611 makes contact with the second valve seat portion 412*c*, and the second fluid passage 412 is closed.

As described above, in the range of the first valve element control region, the first fluid passage 411 opens, and a flow quantity of fluid flowing through the first fluid passage 411 is controlled, in the condition where the second fluid passage 412 is closed.

Subsequently, in the range of the both valve full close region, the rod 71 moves to the position shown in FIG. 6 so that the first urging portion 712 of the thereby rod 71 is spaced from the first valve element 50, and the second urging portion 713 of the rod 71 is also spaced from the second valve element 60. Therefore, the urging force, which is against the biasing force of the first biasing member 513, does not act onto the first valve element 50, and the urging force, which is against the biasing force of the second biasing member 613, does not act onto the second valve element 60. In this way, the seal portion 511*a* of the first valve element portion 511 makes contact with the first valve seat portion 411*c*, and the seal portion 611*a* of the second valve element portion 611 also makes contact with the second valve seat portion 412*c*, thereby to close both the first fluid passage 411 and the second fluid passage 412.

As described above, in the range of the both valve full close region, a condition is made where both the first fluid passage 411 and the second fluid passage 412 are closed.

Furthermore, in the range of the second valve element control region, the rod 71 moves from the position shown in FIG. 6 in the direction to approach the connecting portion 43 so that the second urging portion 713 of the thereby rod 71 makes contact with the second valve element 60. Subsequently, the urging force, which is against the biasing force of the second biasing member 613, acts on the second valve element 60. In this way, the seal portion 611*a* of the second valve element portion 611 is spaced from the second valve seat portion 412*c*, and the second fluid passage 412 is opened.

In the range of the second valve element control region, the first urging portion 712 of the rod 71 is spaced from the first valve element 50. Therefore, the urging force, which is against the biasing force of the first biasing member 513, does not act onto the first valve element 50. In this way, the seal portion 511*a* of the first valve element portion 511 makes contact with the first valve seat portion 411*c*, and the first fluid passage 411 is closed.

As described above, in the range of the second valve element control region, the second fluid passage 412 is opened, and a flow quantity of fluid flowing through the second fluid passage 412 is controlled, in the condition where the first fluid passage 411 is closed.

As described above, the integrated valve 30 of the present embodiment includes the feed screw mechanism 70*a*, which converts the rotational driving force of the electric motor 72 into the thrust force of the rod 71 in the axial direction AD, and the rotation prevention mechanism 75, which regulates rotation of the rod 71 caused by the rotational driving force of the electric motor 72.

In this way, the male thread 711*a*, which is formed on the rod 71 and the output shaft 73, and the female thread 731*a* form the feed screw mechanism 70*a*. In addition, the configuration, in which rotation of the rod 71 is regulated with the rotation prevention mechanism 75, is employed. Thus, it enables to restrain loss in the output power caused by rotation of the rod 71. That is, the integrated valve 30 of the present embodiment enables to enhance a transmission efficiency of the output power, when each of the valve elements 50 and 60 is displaced by the actuator 70, compared with a configuration in which the rod 71 moves in the axial direction AD while rotating.

In the integrated valve 30 of the present embodiment, the rotation prevention mechanism 75 is configured with the housing groove portion 432, the rod groove portion 714, and the rotation regulating member 715. The present configuration enables to prevent rotation of the rod 71 steadily even in a state where the rotational driving force of the electric motor 72 acts onto the rod 71 through the output shaft 73.

In particular, the integrated valve 30 of the present embodiment has the configuration in which the rotation regulating member 715 is arranged between the groove portions 432 and 714, which are formed in both the housing 40 and the rod 71, respectively. Therefore, it enables to restrain the rod 71 from increasing in size in the radial direction RD in the integrated valve 30.

The integrated valve 30 of the present embodiment includes the deceleration mechanism 74, which slows down the rotational output from the electric motor 72 and transmits the output to the output shaft 73. In this way, in the configuration, in which the electric motor 72 is connected with the output shaft 73 via the deceleration mechanism 74, the movement of each of the valve elements 50 and 60 caused by the rotational driving force of the electric motor 72 becomes small. Therefore, it enables to enhance accuracy of the flow quantity control of coolant by using the valve elements 50 and 60.

In particular, in the integrated valve 30 of the present embodiment, the deceleration mechanism 74 is configured with the external gear 742, which is formed with the multiple arc-shaped outer teeth on the radially outside, and the internal gear 433, which is formed with the multiple arc-shaped inner teeth meshed with the outer teeth of the external gear 742.

In this way, slippage between the deceleration gear 740 of the deceleration mechanism 74 and the internal gear 433 can be restrained. Therefore, loss in the output power in the deceleration mechanism 74 can be restrained. Therefore, it enables to enhance a transmission efficiency of the output power at the time when the valve elements 50 and 60 are displaced in the actuator 70.

Herein, the actuator of the integrated valve 30 of the present embodiment has a configuration in which the internal gear 433 and the external gear 742, which form the deceleration mechanism 74, are located on the radially outside of the rotor 722. In this arrangement configuration, the deceleration mechanism 74 and the rotor 722 do not overlap with each other in the axial direction AD. Therefore, it enables to downsize the actuator 70 in the axial direction AD.

In particular, in the actuator of the integrated valve 30 of the present embodiment, the inner diameter of the internal gear 433 and the outer diameter of the external gear 742 can be enlarged. Therefore, a force acting on each of the teeth when the teeth transmit rotational torque becomes smaller, compared with a configuration, such as planetary gears, in which a force is transmitted at a small diameter position.

Therefore, the deceleration mechanism 74 can be reduced in size in the axial direction AD by reducing the thickness of the internal gear 433 and the external gear 742. As a result, it enables to downsize the actuator in the axial direction AD. In addition, in the deceleration mechanism 74 of the present embodiment, the internal gear 433 and the external gear 742 can be formed of resin, which has a low strength. Therefore, it enables cost reduction of the actuator.

In the actuator of the integrated valve 30 of the present embodiment, the rotation transmission pin 732a is located on the outside of the rotor 722 such that the rod 71 does not overlap with the rotor 722 in the axial direction AD. It enables to downsize the size of the actuator in the axial direction AD.

In particular, in the actuator of the integrated valve 30 of the present embodiment, the female thread 731a of the output shaft 73, the eccentric shaft 723 of the rotor 722, and the internal gear 433 and the external gear 742 of the deceleration mechanism 74 are arranged to overlap with each other in the radial direction RD of the rod 71. It enables to downsize the actuator sufficiently in the axial direction AD.

Herein, in the actuator of the integrated valve 30 of the present embodiment, the stator 721 of the electric motor 72 is located on the outside of the cover 720, which accommodates the rotor 722 in a sealing state. In this way, the configuration of the setting the stator 721 located on the outside of the cover 720 enables to avoid reduction in the sealing performance of the interior of the cover 720 due to a wiring, which is connected to the stator 721, or the like.

In the actuator of the integrated valve 30 of the present embodiment, the electric motor 72 is configured with a stepping motor.

An open loop control, which does not need a sensor or the like, can be used for a stepping motor and can employ a simple configuration with less number of components, compared with a servomotor or the like, which needs an encoder for feedback, or the like. Therefore, in particular, a stepping motor is suitable for the electric motor 30 of the actuator of the present disclosure.

Furthermore, the actuator of the integrated valve 30 of the present embodiment includes the rotation prevention mechanism 74. Therefore, even when the rotational driving force of the electric motor 72 acts on the rod 71 via the output shaft 73, it can restrict rotation of the rod 71 steadily.

Second Embodiment

Subsequently, the second embodiment will be described with reference to FIGS. 11 to 15. The integrated valve 30 of the present embodiment is different from the first embodiment in that a seal portion 511c of the first valve element 50, which is in contact with the first valve seat portion 411c, is in a shape of a spherical surface.

As described in the first embodiment, the integrated valve 30 is applied to the refrigeration cycle 10 in which a flow quantity of fluid flowing through the first fluid passage 411, when the first fluid passage 411 is full open, becomes less than a flow quantity of fluid flowing through the second fluid passage 412, when the second fluid passage 412 is full open. In such a device, an error of the throttle opening of the first fluid passage 411 affects a flow quantity largely rather than that of the second fluid passage 412. Accordingly, high accuracy is apt to be required to a flow quantity control in the first fluid passage 411.

Figure 11:
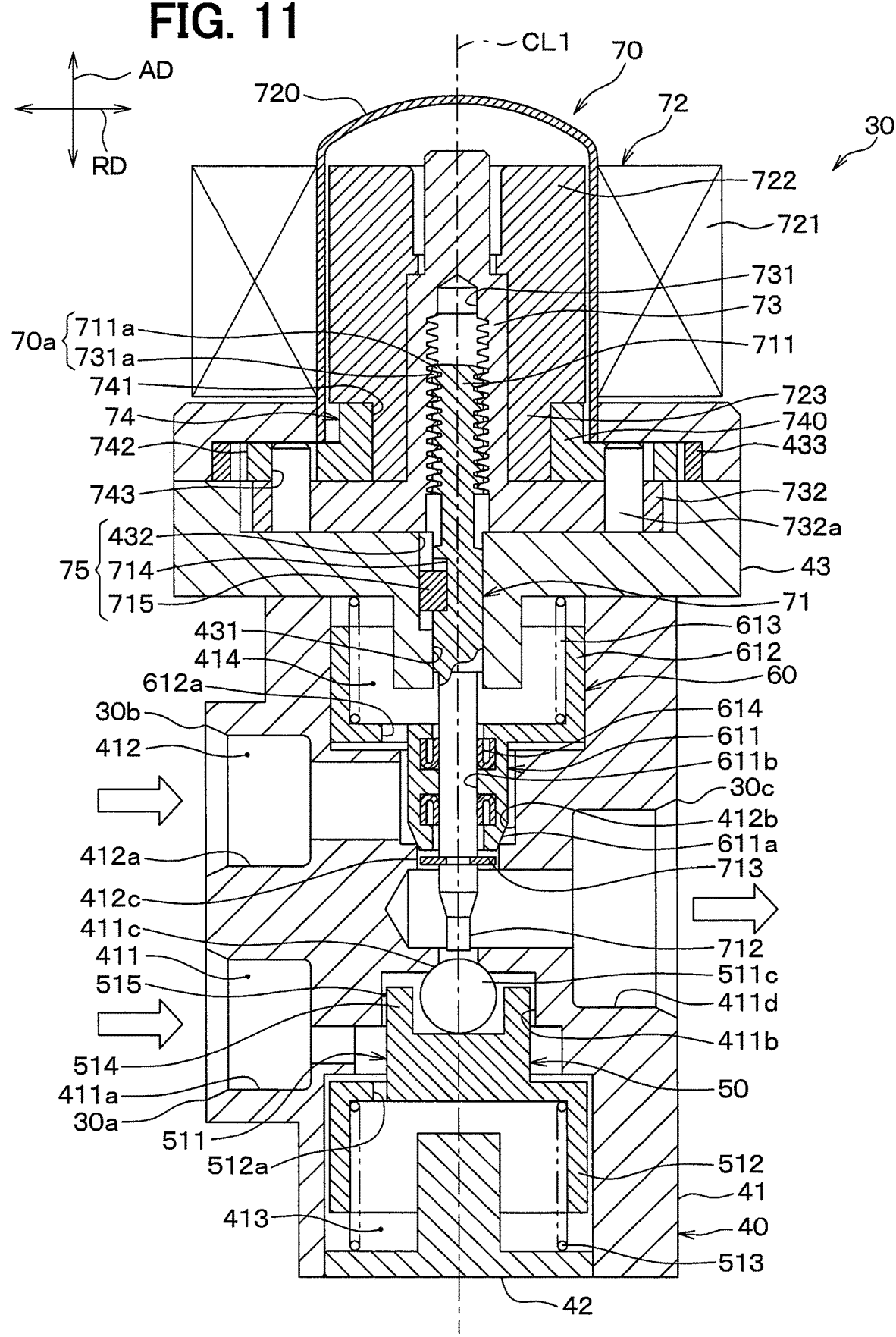
FIG. 11 it is a sectional view of an integrated valve taken along the axial direction according to a second embodiment.

Therefore, in the present embodiment, as shown in FIG. 11, the seal portion 511c of the first valve element portion 511 of the first valve element 50 is formed to be in a shape of a spherical surface. A portion of the first valve seat portion 411c, which corresponds to the seal portion 511c, is applied with C-shaped chamfering to be in a conical shape to make line contact with the seal portion 511c. The portion of the first valve seat portion 411c, which corresponds to the seal portion 511c, may be in a shape, for example, in a tubular shape, so that the seal portion 511c and the first valve seat portion 411c make contact with each other.

Specifically, in the present embodiment, the first valve element portion 511 and the seal portion 511c are formed as separate components. The seal portion 511c is formed as a spherical body. A guide portion 514 in a tubular shape is provided to restrict movement of the first valve element portion 511 in the radial direction RD.

In this way, the seal portion 511c of the first valve element 50 is formed in a shape of the spherical surface, thereby to enable to maintain a sealing performance on the first valve element 50, even when displacement in the axis of the seal portion 511c or the like arises. As a result, it enables to restrain leakage of coolant when the first fluid passage 411 is full close and enables to enhance accuracy of the flow quantity control in the first fluid passage 411.

Herein, the configuration, in which the seal portion 511c of the first valve element 50 is formed in a shape of the spherical surface, raises a drawback to excessively increase a change in a magnitude of change in a flow quantity of coolant to the throttle opening between the first valve element 50 and the first valve seat portion 411c.

Therefore, in the present embodiment, a small clearance portion 515 is formed in a passage from the first inlet hole 30a to the first valve seat portion 411c in the first fluid passage 411. The small clearance portion 515 is close to the first valve element portion 511 of the first valve element 50. Specifically, the small clearance portion 515 is defined between the outer wall of the guide portion 514 of the first valve element portion 511 and the inner wall of the first intermediate passage 411b.

Figure 12:
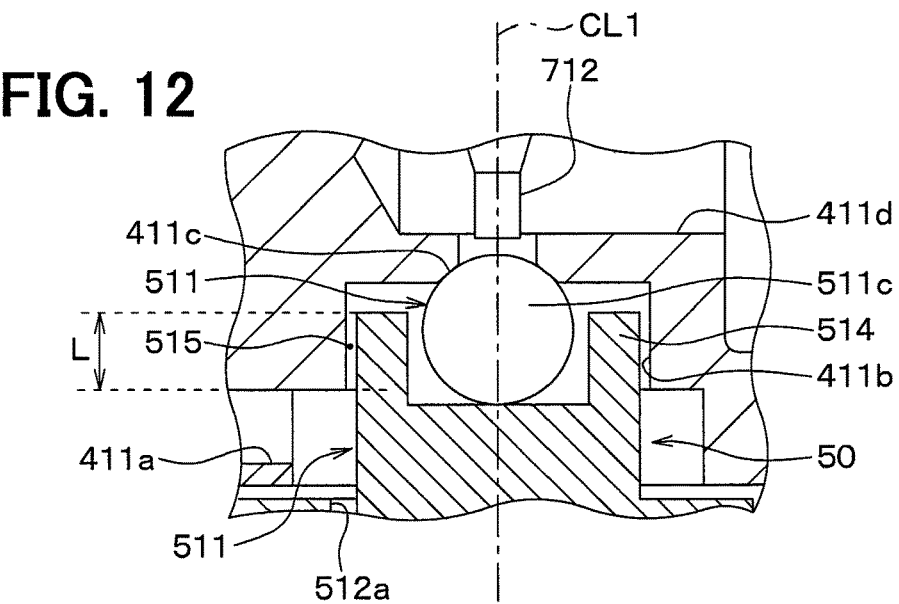
FIG. 12 it is an enlarged sectional view of a main portion of the integrated valve shown in FIG. 11.
Figure 13:
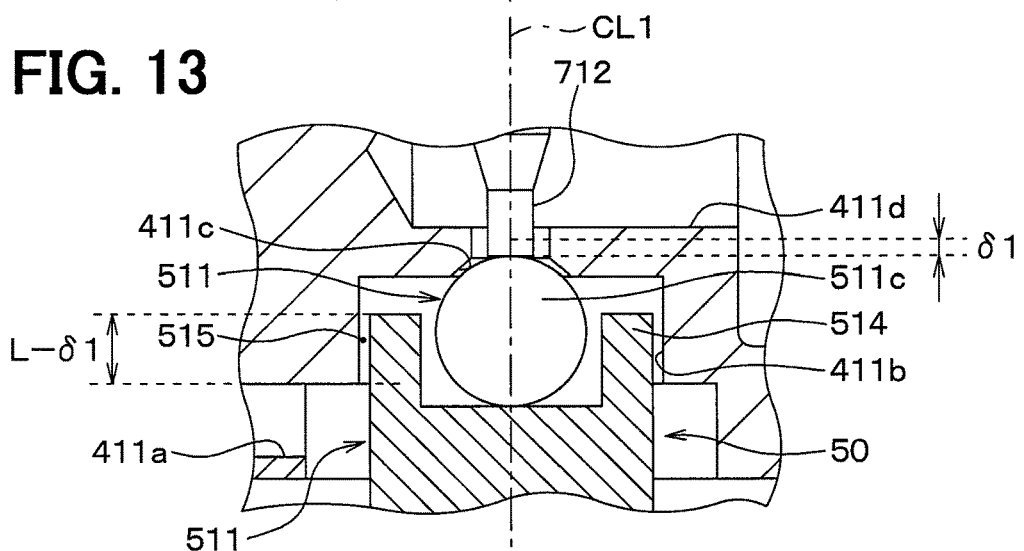
FIG. 13 it is an enlarged sectional view of a main portion of the integrated valve shown in FIG. 11.
Figure 14:
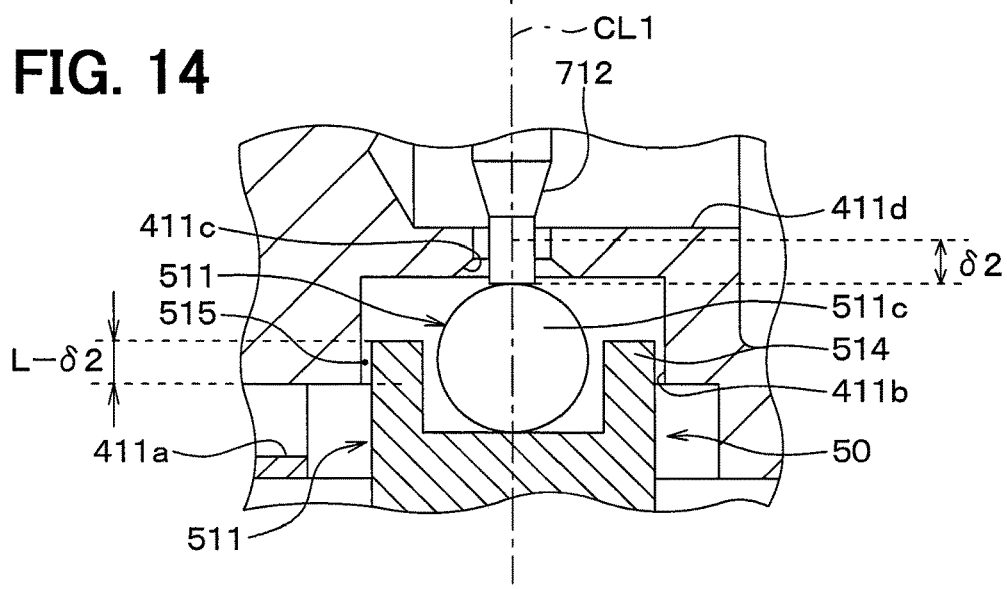
FIG. 14 it is an enlarged sectional view of a main portion of the integrated valve shown in FIG. 11.

FIG. 12 is a sectional view showing a state where the first valve element portion 511 is in contact with the first valve seat portion 411c. FIG. 13 is a sectional view showing a state where the first valve element portion 511 is slightly spaced from the first valve seat portion 411c. FIG. 14 is a sectional view showing a state where the first valve element portion 511 is largely spaced from the first valve seat portion 411c.

When the first valve element portion 511 is displaced from the state shown in FIG. 12 to the state shown in FIG. 13, a passage length of the small clearance portion 515 become shorter by a movement Δ1 of the first valve element portion 511. That is, when the first valve element portion 511 is displaced from the state shown in FIG. 12 to the state shown in FIG. 13, the passage length of the small clearance portion 515 changes from L to L-Δ1.

Furthermore, when the first valve element portion 511 is displaced from the state shown in FIG. 12 to the state shown in FIG. 14, the passage length of the small clearance portion 515 become shorter by the movement Δ2 of the first valve element portion 511. That is, when the first valve element portion 511 is displaced from the state shown in FIG. 12 to the state shown in FIG. 14, the passage length of the small clearance portion 515 changes from L to L-$\Delta 2$. The movement $\Delta 2$ is greater than the movement $\Delta 1$ ($\Delta 2 > \Delta 1$).

The small clearance portion 515 is configured in this way so that the passage length becomes shorter, as the first valve element portion 511 is spaced from the first valve seat portion 411c, and the passage length becomes longer, as the first valve element portion 511 approaches the first valve seat portion 411c. That is, the small clearance portion 515 is configured so that its passage resistance becomes smaller, as the first valve element portion 511 is spaced from the first valve seat portion 411c, and its passage resistance becomes greater, as the first valve element portion 511 approaches the first valve seat portion 411c.

The small clearance portion 515 is formed so that the flow resistance of the small clearance portion 515 become less than the flow resistance between the first valve element 50 and the first valve seat portion 411c in a low flow quantity region, in which a flow quantity through the first fluid passage 411 is controlled to be less than or equal to a predetermined flow quantity.

The small clearance portion 515 is formed so that the flow resistance of the small clearance portion 515 become greater than the flow resistance between the first valve element 50 and the first valve seat portion 411c in a high flow quantity region, in which a flow quantity through the first fluid passage 411 is controlled to be greater than the predetermined flow quantity.

Figure 15:
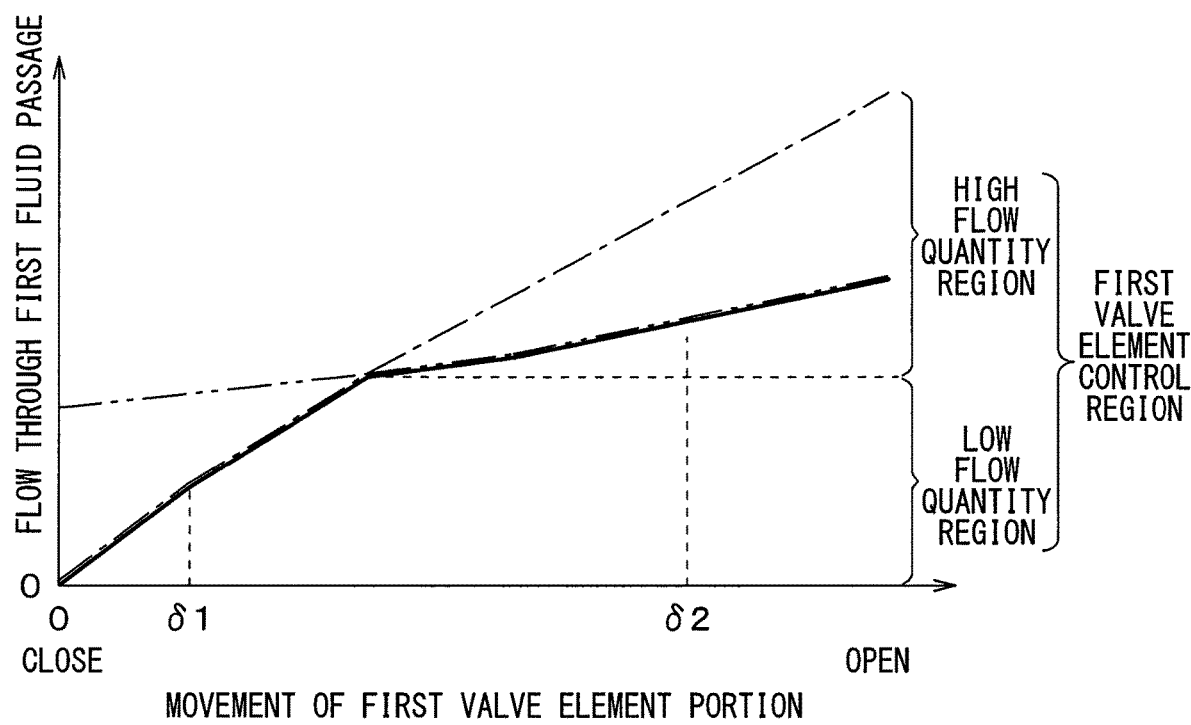
FIG. 15 it is a view showing a relation between an amount of movement of the first valve element of the integrated valve with respect to a flow quantity in a first fluid passage according to the second embodiment.

FIG. 15 shows an estimation result of calculation made individually on a change in the flow quantity in the first fluid passage 411 to the passage length of the small clearance portion 515 and a change in the flow quantity in the first fluid passage 411 to the throttle opening between the first valve element 50 and the first valve seat portion 411c when the first valve element 50 is displaced. The one-point chain line shown in FIG. 15 represents the change in the flow quantity in the first fluid passage 411 to the throttle opening between the first valve element 50 and the first valve seat portion 411c. The two-point chain line shown in FIG. 15 represents the change in the flow quantity in the first fluid passage 411 to the passage length of the small clearance portion 515.

As shown in FIG. 15, a magnitude of the change in the flow quantity in the first fluid passage 411 to the passage length of the small clearance portion 515 is smaller than the magnitude of the change in the flow quantity in the first fluid passage 411 to the throttle opening between the first valve element 50 and the first valve seat portion 411c.

In the first valve element control region, a flow quantity of coolant flowing through the small clearance portion 515 is greater than a flow quantity of coolant flowing between the first valve element 50 and the first valve seat portion 411c in the low flow quantity region.

On the other hand, in the first valve element control region, a flow quantity of coolant flowing through the small clearance portion 515 is less than a flow quantity of coolant flowing between the first valve element 50 and the first valve seat portion 411c in the high flow quantity region.

According to the estimation result in FIG. 15, as the first valve element 50 is displaced in the axial direction AD, as shown by the solid line in FIG. 15, the flow quantity in the first fluid passage 411 changes. That is, in the low flow quantity region within the first valve element control region, the flow quantity in the first fluid passage 411 changes according to the throttle opening between the first valve element 50 and the first valve seat portion 411c. On the other hand, in the high flow quantity region within the first valve element control region, the flow quantity in the first fluid passage 411 changes according to the passage length of the small clearance portion 515.

Other configurations are equivalent to those of the first embodiment, and an equivalent effect to that of the first embodiment can be produced also in the configuration of the present embodiment.

In particular, in the present embodiment, the shape of the seal portion 511c of the first valve element 50 is in a form of the spherical surface. Therefore, it enables to maintain the sealing performance on the first valve element 50 even when displacement in its axis or the like arises. As a result, coolant leakage when the first fluid passage 411 is full close can be restrained.

In the present embodiment, the small clearance portion 515 is formed in the first fluid passage 411. In addition, in the low flow quantity region within the first valve element control region, it is set so that the flow resistance in the small clearance portion 515 becomes smaller than the flow resistance between the first valve element 50 and the first valve seat portion 411c. In the high flow quantity region within the first valve element control region, it is set so that the flow resistance in the small clearance portion 515 become greater than the flow resistance between the first valve element 50 and the first valve seat portion 411c.

This enables to implement a fine control of the flow quantity of coolant by using the small clearance portion 515 even in a case where the flow quantity control of coolant becomes difficult only by using the space between the first valve element 50 and the first valve seat portion 411c. As a result, it enables to implement the flow quantity control of coolant in the first fluid passage 411 with high accuracy.

Third Embodiment

Subsequently, the third embodiment will be described with reference to FIG. 16. The integrated valve 30 of the present embodiment is different from the second embodiment in that a seal portion 511d of the first valve element portion 511 is in a flat shape.

Figure 16:
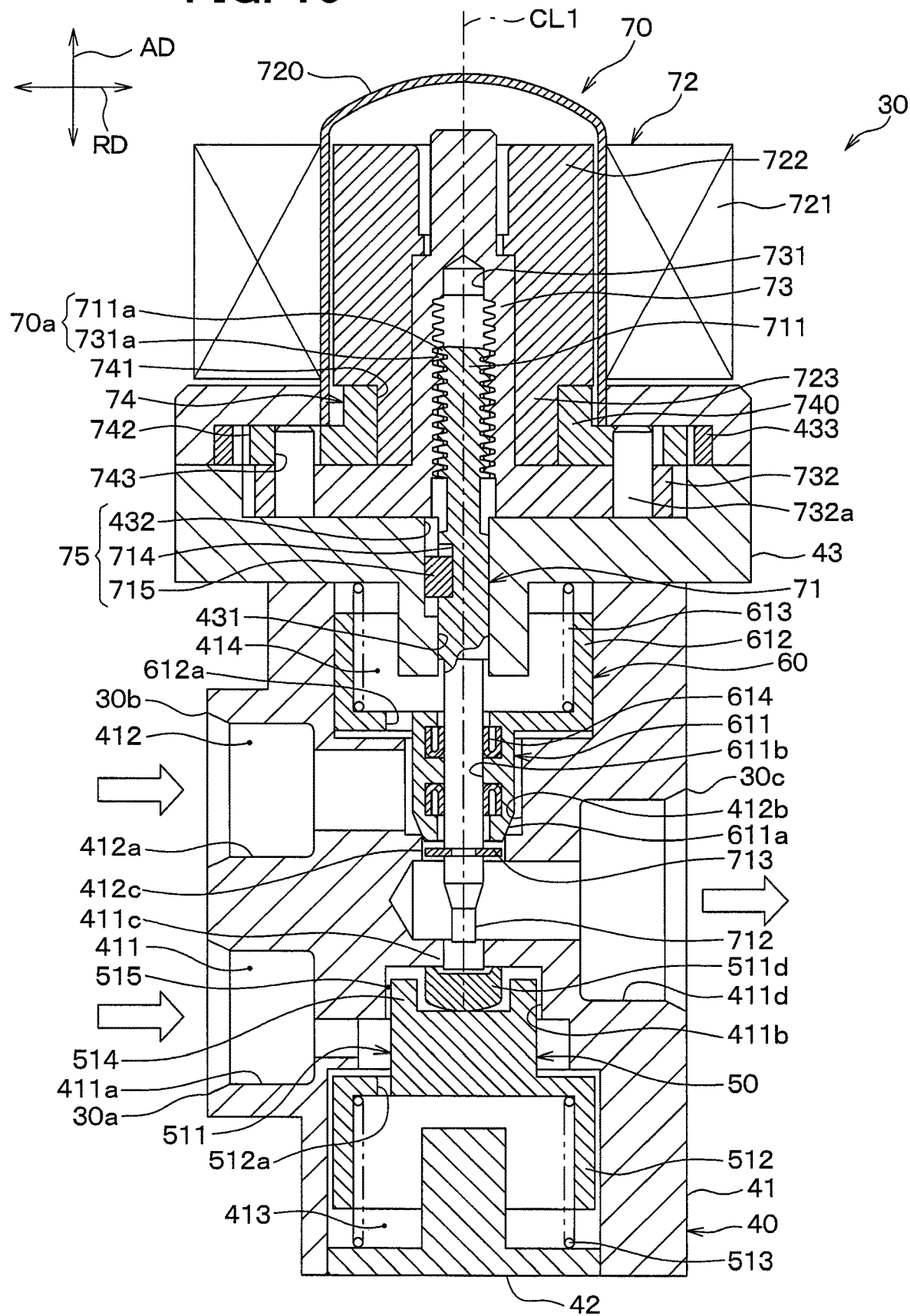
FIG. 16 it is a sectional view of an integrated valve taken along the axial direction according to a third embodiment.

As shown in FIG. 16, in the present embodiment, the seal portion 511d of the first valve element portion 511 of the first valve element 50 is in a flat shape. In addition, a portion of the first valve seat portion 411c corresponding to the seal portion 511d is also in a flat shape.

Specifically, in the present embodiment, the first valve element portion 511 and the seal portion 511d are formed as separate components. A portion of the seal portion 511d, which makes contact with the first valve seat portion 411c, is formed in a flat shape. A portion of the seal portion 511d, which makes contact with the first valve element portion 511, is formed in a curved surface shape which projects toward the first valve element portion 511.

Other configurations are equivalent to the second embodiment. In the present embodiment, the small clearance portion 515 is formed in the first fluid passage 411 similarly to the second embodiment. Therefore, it enables fine control of the flow quantity of coolant in the small clearance portion 515 even in a case where the flow quantity control of coolant becomes difficult by using only the space between the first valve element 50 and the first valve seat portion 411c.

Fourth Embodiment

Subsequently, the fourth embodiment will be described with reference to FIGS. 17 to 23. The integrated valve 30 of the present embodiment is different from the first embodiment in a configuration which enables to change an amount of movement of the rod 71 with respect to the rotational angle of the electric motor 72 in the range of the second valve element control region.

In the integrated valve 30, an error in flow quantity becomes great when its throttle opening is minute. Therefore, the integrated valve 30 is occasionally requested to control at a low speed when its throttle opening is minute and to control at a high speed to its full open state after its throttle opening becomes large to certain extent.

Similarly to the first embodiment, in the integrated valve 30 of the present embodiment, the diameter D1 of the opening of the first valve seat portion 411c is smaller than the diameter D2 of the opening of the second valve seat portion 412c. A flow quantity through the first fluid passage 411 is smaller than a flow quantity through the second fluid passage 412. Therefore, the throttle opening between the first valve element 50 and the first valve seat portion 411c is desirably controlled at a low speed.

On the other hand, the throttle opening between the second valve element 60 and the second valve seat portion 412c is desirably controlled at a high speed to its full open in a range of the high flow quantity region in which a flow quantity of fluid flowing through the second fluid passage 412 is greater than a predetermined flow quantity.

Figure 17:
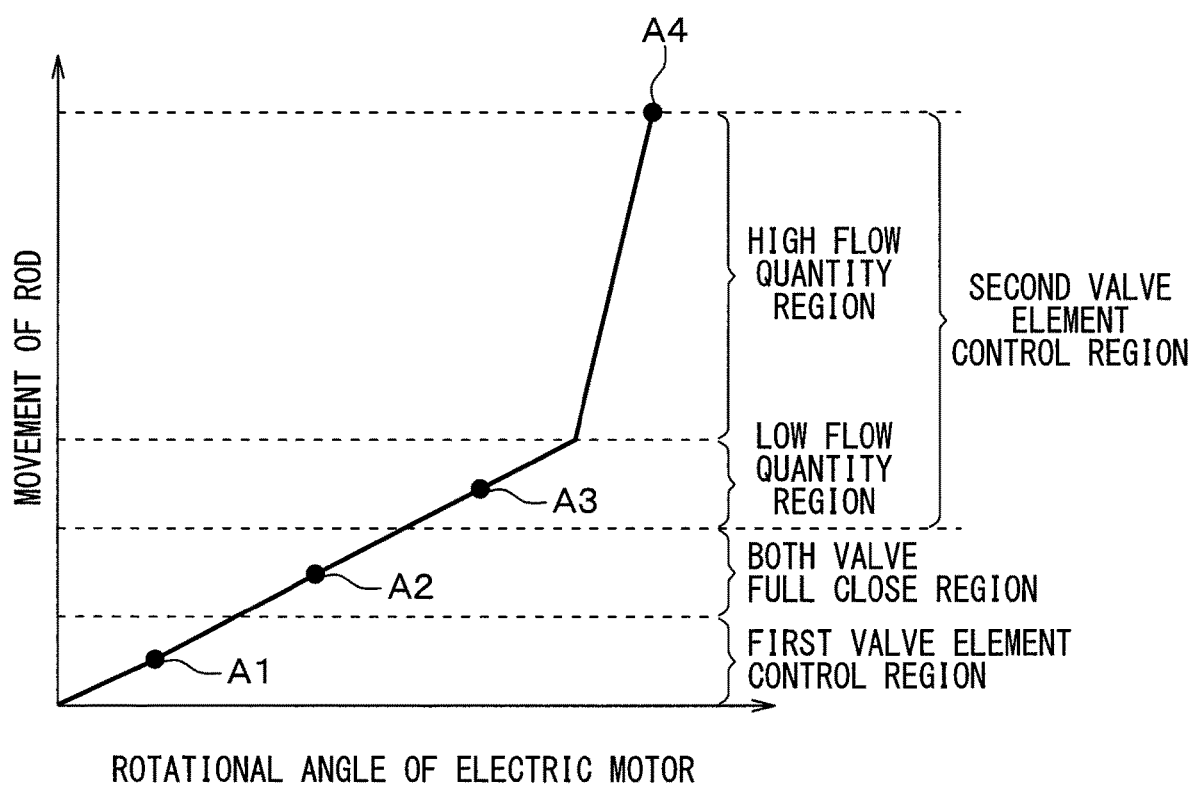
FIG. 17 it is a view showing an amount of movement of the rod with respect to a rotational angle of the electric motor of the integrated valve according to the fourth embodiment.

Therefore, as shown in FIG. 17, the integrated valve 30 of the present embodiment has a configuration so that a magnitude of increase in the amount of movement of the rod 71 with respect to the rotational angle of the electric motor 72 in the high flow quantity region within the second valve element control region becomes greater, compared with that in the low flow quantity region within the second valve element control region. As follows, a detailed configuration of the integrated valve 30 of the present embodiment will be described with reference to FIGS. 18 and 19.

Figure 18:
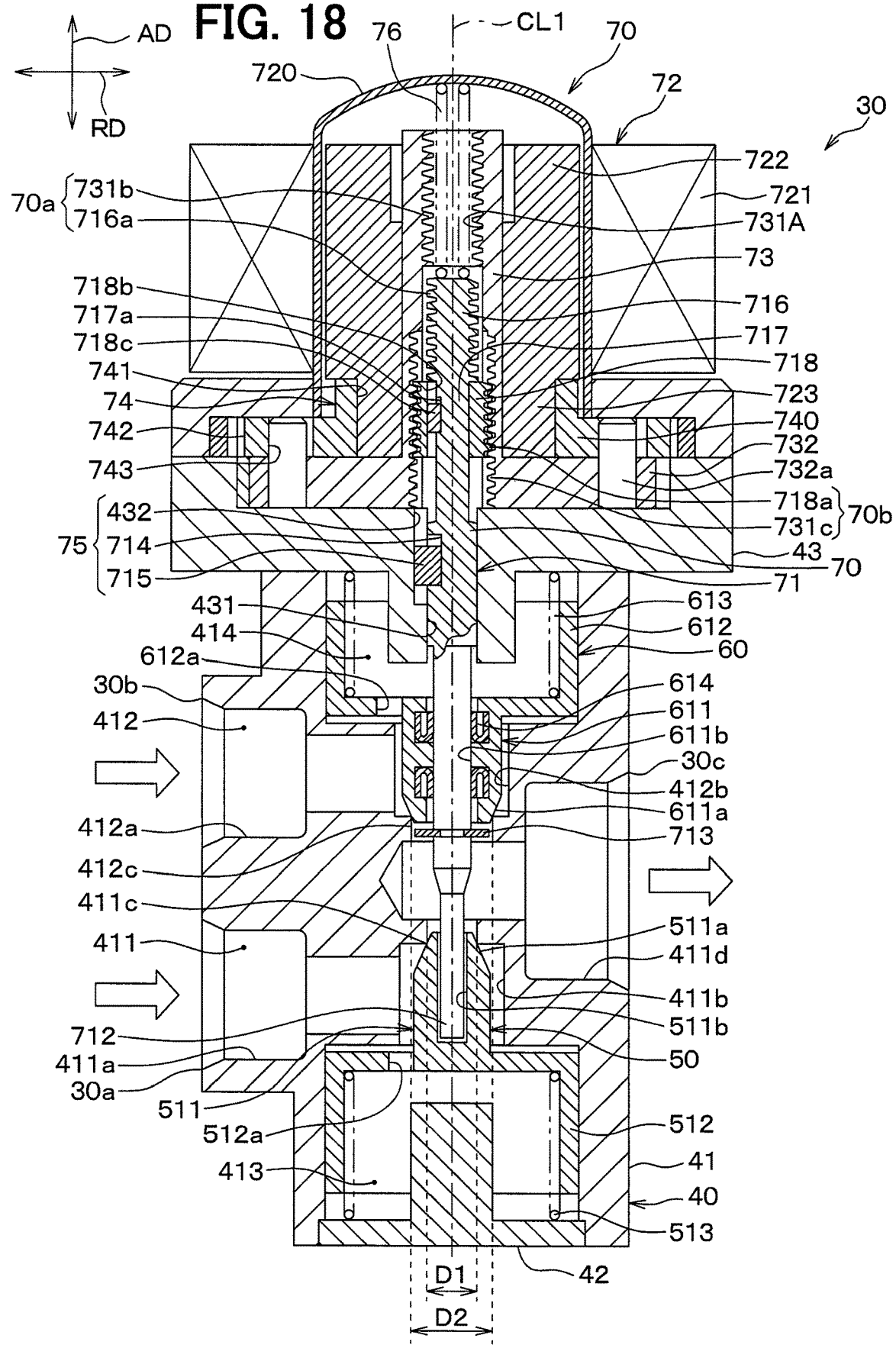
FIG. 18 it is a sectional view of an integrated valve taken along the axial direction according to a fourth embodiment.
Figure 19:
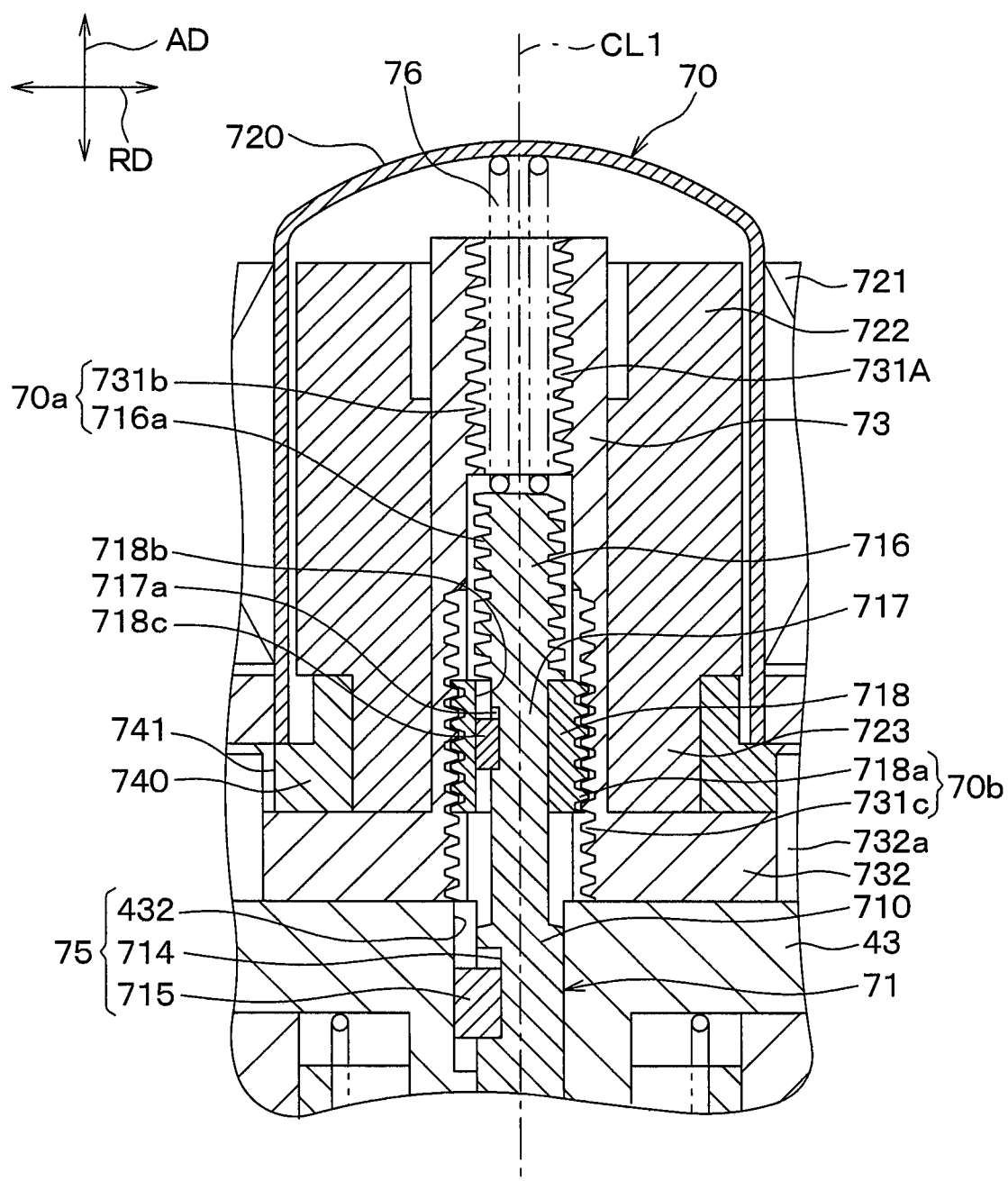
FIG. 19 it is an enlarged sectional view of a main portion of the integrated valve shown in FIG. 17.

As shown in FIGS. 18 and 19, the rod 71 of the present embodiment is configured with a main axis portion 710, which is formed with the first urging portion 712 and the second urging portion 713, and a tubular portion 718, which is formed in a tubular shape to surround the outer circumferential periphery of the main axis portion 710.

The main axis portion 710 of the rod 71 is formed with an output side end 716 and a small diameter portion 717 at a portion opposed to the inner circumferential periphery of the output shaft 73. The output side end 716 is formed with a first male thread 716a on its radially outside. The small diameter portion 717 is reduced in the diameter compared with the output side end 716. The first male thread 716a formed on the main axis portion 710 forms a male screw portion, which meshes with a first female thread 731b formed in a rod receiving hole 731A of the output shaft 73, which will be described later.

The small diameter portion 717 is a portion supporting the tubular portion 718 to be slidable in the axial direction AD. The small diameter portion 717 is formed with a small diameter side groove portion 717a at a portion opposed to the tubular portion 718. The small diameter side groove portion 717a extends along the axial direction AD.

The tubular portion 718 is a member in contact with the main axis portion 710 in the axial direction AD of the rod 71 and causes the main axis portion 710 to displace in the axial direction of the rod AD. The diameter of the inner circumferential periphery of the tubular portion 718 is greater than the diameter of the outer circumferential periphery of the small diameter portion 717 and is smaller than the diameter of the outer circumferential periphery of the output side end 716 so that the tubular portion 718 makes contact with a step portion formed between the output side end 716 and the small diameter portion 717 in the main axis portion 710.

The tubular portion 718 is formed with a second male thread 718a at a portion on the side of the outer circumferential periphery, which is opposed to the inner circumferential periphery of the output shaft 73. The second male thread 718a forms a male screw portion, which meshes with the second female thread 731c formed in the rod receiving hole 731A of the output shaft 73, which will be described later.

The tubular portion 718 is formed with a tube groove portion 718b at an inner circumferential periphery portion opposed to the small diameter side groove portion 717a. The tube groove portion 718b is formed to extend along the axial direction AD of the rod 71.

A regulating member 718c is located in a space formed between the small diameter side groove portion 717a and the tube groove portion 718b to regulate rotation of the tubular portion 718. In the present embodiment, the small diameter side groove portion 717a, the tube groove portion 718b, and the regulating member 718c restricts the tubular portion 718 from rotating with the output shaft 73.

The output shaft 73 of the present embodiment is formed with the rod receiving hole 731A to receive the output side end 716 of the main axis portion 710 and the tubular portion 718. The rod receiving hole 731A of the present embodiment is formed as a through hole extending along the valve shaft center CL1. The rod receiving hole 731A of the present embodiment is formed with the first female thread 731b and a second female thread 731c which are different from each other in the screw pitch.

The first female thread 731b forms a female screw portion, which meshes with the first male thread 716a formed on the output side end 716 of the main axis portion 710. In the present embodiment, the first feed screw mechanism 70a is configured with the first male thread 716a and the first female thread 731b.

The first feed screw mechanism 70a converts the rotational driving force of the electric motor 72 into the thrust force of the rod 71 in the axial direction AD by mesh between the first male thread 716a and the first female thread 731b in the range of the high flow quantity region within the second valve element control region.

The second female thread 731c forms the female screw portion, which meshes with the second male thread 718a formed in the tubular portion 718. In the present embodiment, the second feed screw mechanism 70b is configured with the second male thread 718a and the second female thread 731c.

The second feed screw mechanism 70b converts the rotational driving force of the electric motor 72 into the thrust force of the rod 71 in the axial direction AD by mesh between the second male thread 718a and the second female thread 731c in the range of the first valve element control region, the both valve full close region, and the low flow quantity region in the second valve element control region.

In the present embodiment, the first male thread 716a and the first female thread 731b are greater in the screw pitch than the second male thread 718a and the second female thread 731c.

Furthermore, in the present embodiment, a third biasing member 76 is equipped to bias the main axis portion 710 so that the first male thread 716a and the first female thread 731b do not mesh with each other in the range of the first valve element control region, the both valve full close region, and the low flow quantity region within the second valve element control region. The third biasing member 76 is located between an end of the main axis portion 710, which is on the opposite of the first urging portion 712, and the cover 720.

In the present embodiment, these configurations enlarges the magnitude of increase in the amount of movement of the rod 71 with respect to the rotational angle of the electric motor 72 in the high flow quantity region within the second valve element control region compared with that in the low flow quantity region within the second valve element control region.

Figure 20:
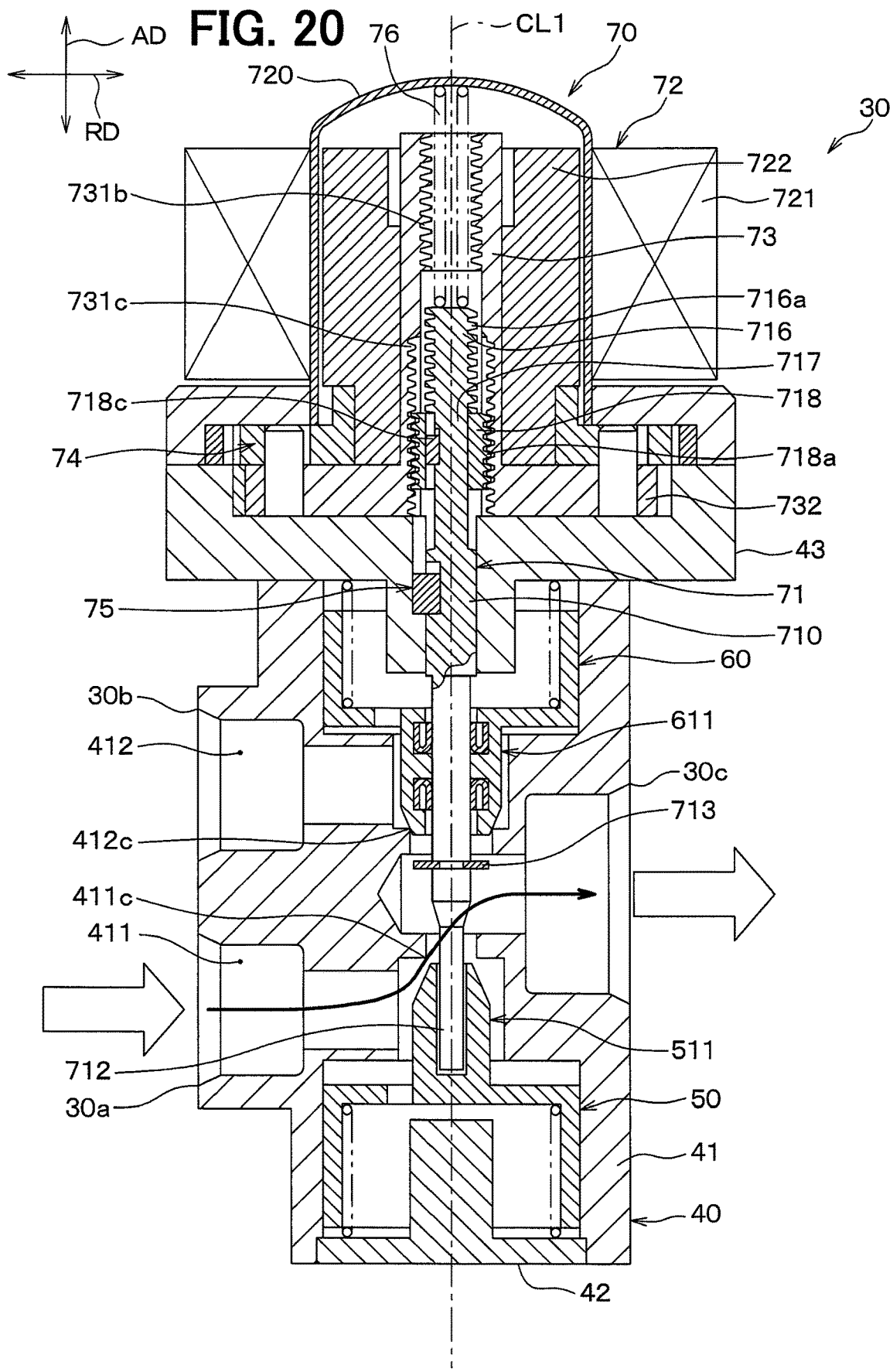
FIG. 20 it is a sectional view showing the integrated valve in a state of a first valve element control region according to the fourth embodiment.
Figure 21:
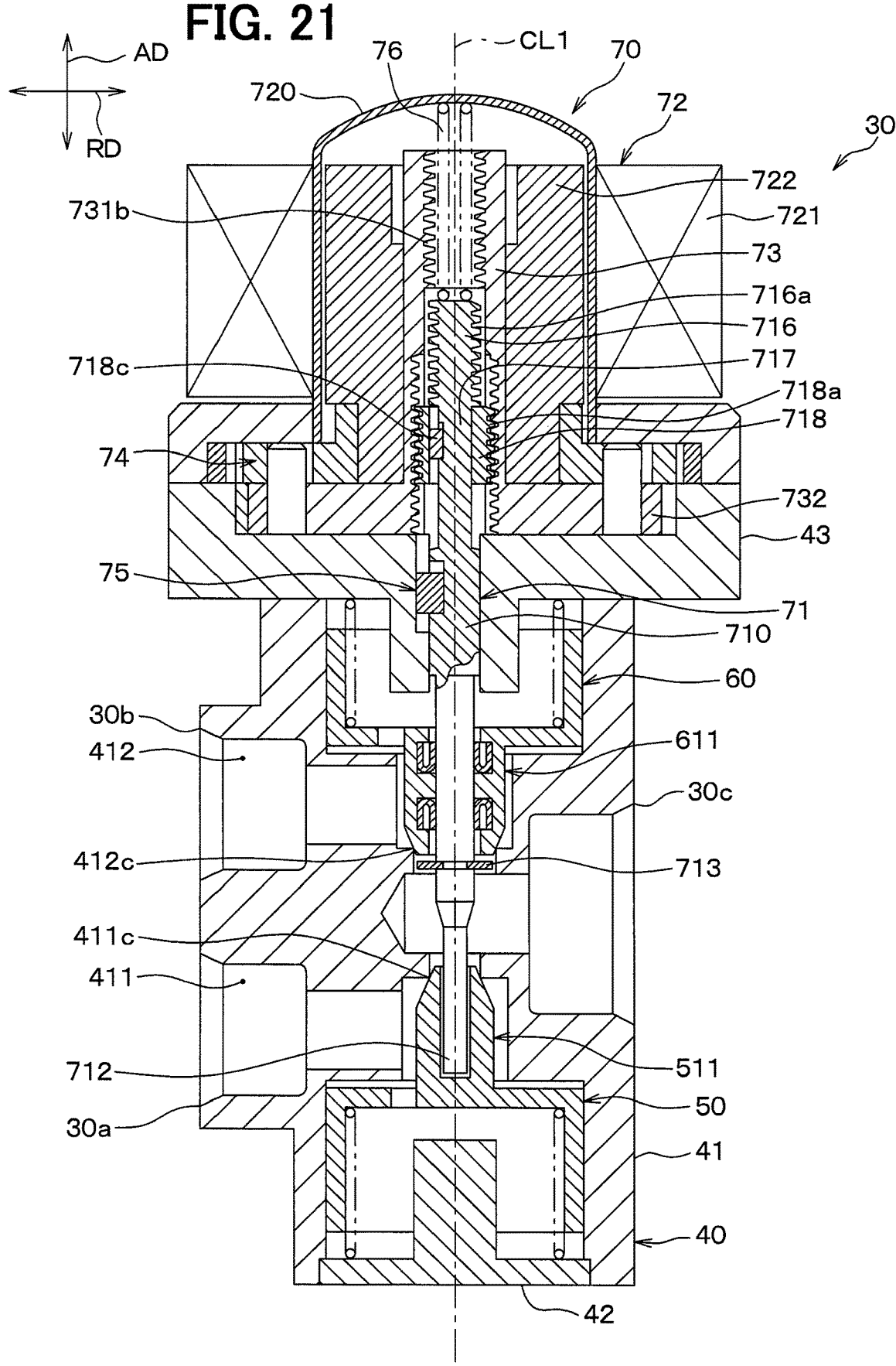
FIG. 21 it is a sectional view showing the integrated valve in a state of a both valve full close region according to the fourth embodiment.
Figure 22:
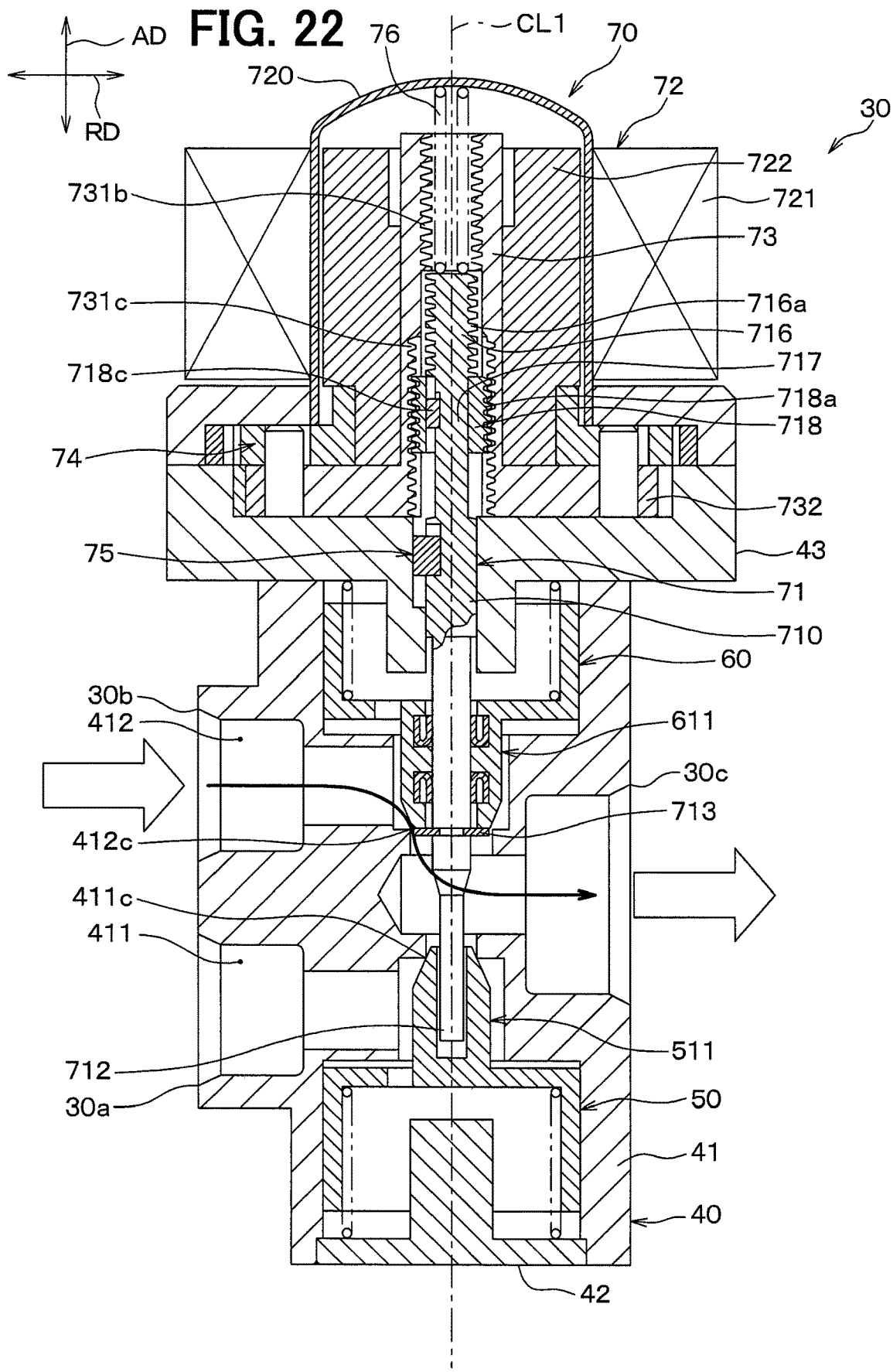
FIG. 22 it is a sectional view showing the integrated valve in a state of a low flow quantity region within a second valve element control region according to the fourth embodiment.
Figure 23:
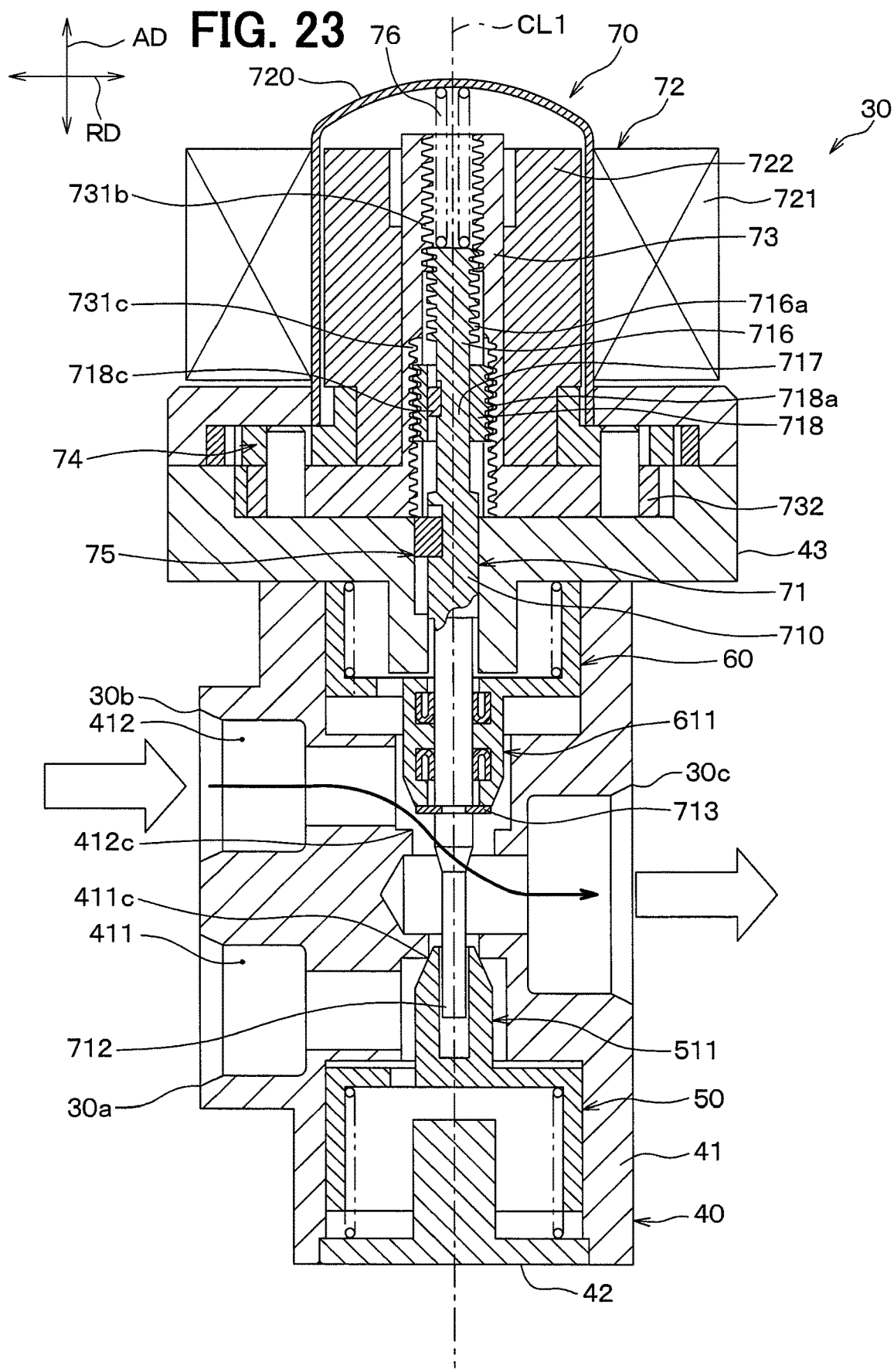
FIG. 23 it is a sectional view showing the integrated valve in a state of a high flow quantity region within the second valve element control region according to the fourth embodiment.

Subsequently, the operation of the integrated valve 30 of the present embodiment will be described with reference to FIGS. 20 to 23. Herein, FIG. 20 is a sectional view of the integrated valve 30 in the plot A1 shown in FIG. 17. FIG. 21 is a sectional view of the integrated valve 30 in the plot A2 shown in FIG. 17. FIG. 22 is a sectional view of the integrated valve 30 in the plot A3 shown in FIG. 17. FIG. 23 is a sectional view of the integrated valve 30 in the plot A4 shown in FIG. 17.

First, as shown in FIG. 20, in the range of the first valve element control region, the main axis portion 710 of the rod 71 moves in the direction to approach the blockade portion 42 by mesh of the second male thread 718*a* with the second female thread 731*c*. Subsequently, the first urging portion 712 of the main axis portion 710 makes contact with the first valve element 50, and an urging force is applied onto the first valve element 50 against the biasing force of the first biasing member 513.

In this way, the seal portion 511*a* of the first valve element portion 511 is spaced from the first valve seat portion 411*c*, and the first fluid passage 411 is opened.

In the range of the first valve element control region, the second urging portion 713 of the main axis portion 710 is spaced from the second valve element 60. Therefore, the urging force, which is against the biasing force of the second biasing member 613, does not act onto the valve element 60. In this way, the seal portion 611*a* of the second valve element portion 611 makes contact with the second valve seat portion 412*c*, and the second fluid passage 412 is closed.

As described above, in the range of the first valve element control region, the first fluid passage 411 opens, and a flow quantity of fluid flowing through the first fluid passage 411 is controlled, in the condition where the second fluid passage 412 is closed.

Subsequently, in the range of the both valve full close region, the main axis portion 710 moves from the position shown in FIG. 20 to the position shown in FIG. 21 by mesh of the second male thread 718*a* with the second female thread 731*c*. Thus, the first urging portion 712 is spaced from the first valve element 50, and the second urging portion 713 is spaced from the second valve element 60. Therefore, the urging force, which is against the biasing force of the first biasing member 513, does not act onto the first valve element 50, and the urging force, which is against the biasing force of the second biasing member 613, does not act onto the second valve element 60. In this way, the seal portion 511*a* of the first valve element portion 511 makes contact with the first valve seat portion 411*c*, and the seal portion 611*a* of the second valve element portion 611 also makes contact with the second valve seat portion 412*c*, thereby to close both the first fluid passage 411 and the second fluid passage 412.

As described above, in the range of the both valve full close region, the condition is made where both the first fluid passage 411 and the second fluid passage 412 are closed.

In the range of the low flow quantity region within the second valve element control region, the main axis portion 710 moves from the position shown in FIG. 21 to the position shown in FIG. 22 by mesh of the second male thread 718*a* and the second female thread 731*c*. Subsequently, the second urging portion 713 of the main axis portion 710 makes contact with the second valve element 60, and the urging force acts onto the second valve element 60 against the biasing force of the second biasing member 613. In this way, the seal portion 611*a* of the second valve element portion 611 is spaced from the second valve seat portion 412*c*, and the second fluid passage 412 is opened.

In the range of the second valve element control region, the first urging portion 712 of the main axis portion 710 is spaced from the first valve element 50. Therefore, the urging force, which is against the biasing force of the first biasing member 513, does not act onto the first valve element 50. In this way, the seal portion 511*a* of the first valve element portion 511 makes contact with the first valve seat portion 411*c*, and the first fluid passage 411 is closed.

Thus, in the range of the low flow quantity region within the second valve element control region, the second fluid passage 412 opens, and a flow quantity of fluid flowing through the second fluid passage 412 is controlled, in the condition where the first fluid passage 411 is closed.

Subsequently, in the range of the high flow quantity region within the second valve element control region, the first male thread 716*a* and the first female thread 731*b* mesh with each other, thereby to move the main axis portion 710 from the position shown in FIG. 22 to the position shown in FIG. 23.

In the present embodiment, the first male thread 716*a* and the first female thread 731*b* are greater in the screw pitch than the second male thread 718*a* and the second female thread 731*c*. Therefore, in the high flow quantity region within the second valve element control region, the magnitude of increase in the amount of movement of the rod 71 with respect to the rotational angle of the electric motor 72 becomes greater compared with that in the low flow quantity region within the second valve element control region. In this way, the seal portion 611*a* of the second valve element portion 611 is spaced away significantly from the second valve seat portion 412*c*, thereby to increase a flow quantity of coolant flowing through the second fluid passage 412.

In the range of the high flow quantity region within the second valve element control region, the first male thread 716*a* and the first female thread 731*b* mesh with each other thereby to move the main axis portion 710. In addition, the tubular portion 718 also moves by the mesh of the second male thread 718*a* with the second female thread 731*c*.

In the present embodiment, the first male thread 716*a* and the first female thread 731*b* are greater in the screw pitch than the second male thread 718*a* and the second female thread 731*c*. Therefore, in the range of the high flow quantity region within the second valve element control region, each of the main axis portion 710 and the tubular portion 718 moves in the state where the contact between the main axis portion 710 and the tubular portion 718 is released. That is, in the range of the high flow quantity region within the second valve element control region, each of the main axis portion 710 and the tubular portion 718 moves in the state where the urging force from the tubular portion 718 does not act onto the main axis portion 710.

Other configurations are equivalent to those of the first embodiment, and an equivalent effect to that of the first embodiment can be produced also in the configuration of the present embodiment.

In particular, the present embodiment employs the configuration in which the rotational driving force of the electric motor 72 is converted into the thrust force of the rod 71 in the axial direction AD by the mesh of the small second male thread 718a with the second female thread 731c, which are small in the screw pitch, in the range of the low flow quantity region within the second valve element control region.

Furthermore, the present embodiment employs the configuration in which the rotational driving force of the electric motor 72 is converted into the thrust force of the rod 71 in the axial direction AD by the mesh of the great first male thread 716a with the first female thread 731b, which are large in the screw pitch, in the range of the high flow quantity region within the second valve element control region.

This enables to control at the low speed, when the throttle opening between the second valve element 60 and the second valve seat portion 412c is minute in the second fluid passage 412, and to control at the high speed after the throttle opening becomes large to certain extent to its full-open.

Fifth Embodiment

Subsequently, the fifth embodiment will be described with reference to FIGS. 24 and 25. The present embodiment is different from the fourth embodiment in that an elastic member 719 is equipped at a portion of the main axis portion 710, which makes contact with the tubular portion 718.

Herein, in the second valve element control region, the first male thread 716a of the main axis portion 710 and the first female thread 731b of the output shaft 73 desirably start to mesh with each other at a time point of the transition from the low flow quantity region to the high flow quantity region.

However, in reality, the time point, at which the first male thread 716a of the main axis portion 710 and the first female thread 731b of the output shaft 73 start to mesh with each other, may be delayed with respect to the time point of the transition from the low flow quantity region to the high flow quantity region in the second valve element control region.

At the time point of the transition from the low flow quantity region to the high flow quantity region within the second valve element control region, the main axis portion 710 and the tubular portion 718 make contact with each other. Accordingly, if the first male thread 716a has not meshed with the first female thread 731b, it is concerned that the main axis portion 710 moves by the urging force from the tubular portion 718 to collapse the first male thread 716a and the first female thread 731b.

Figure 24:
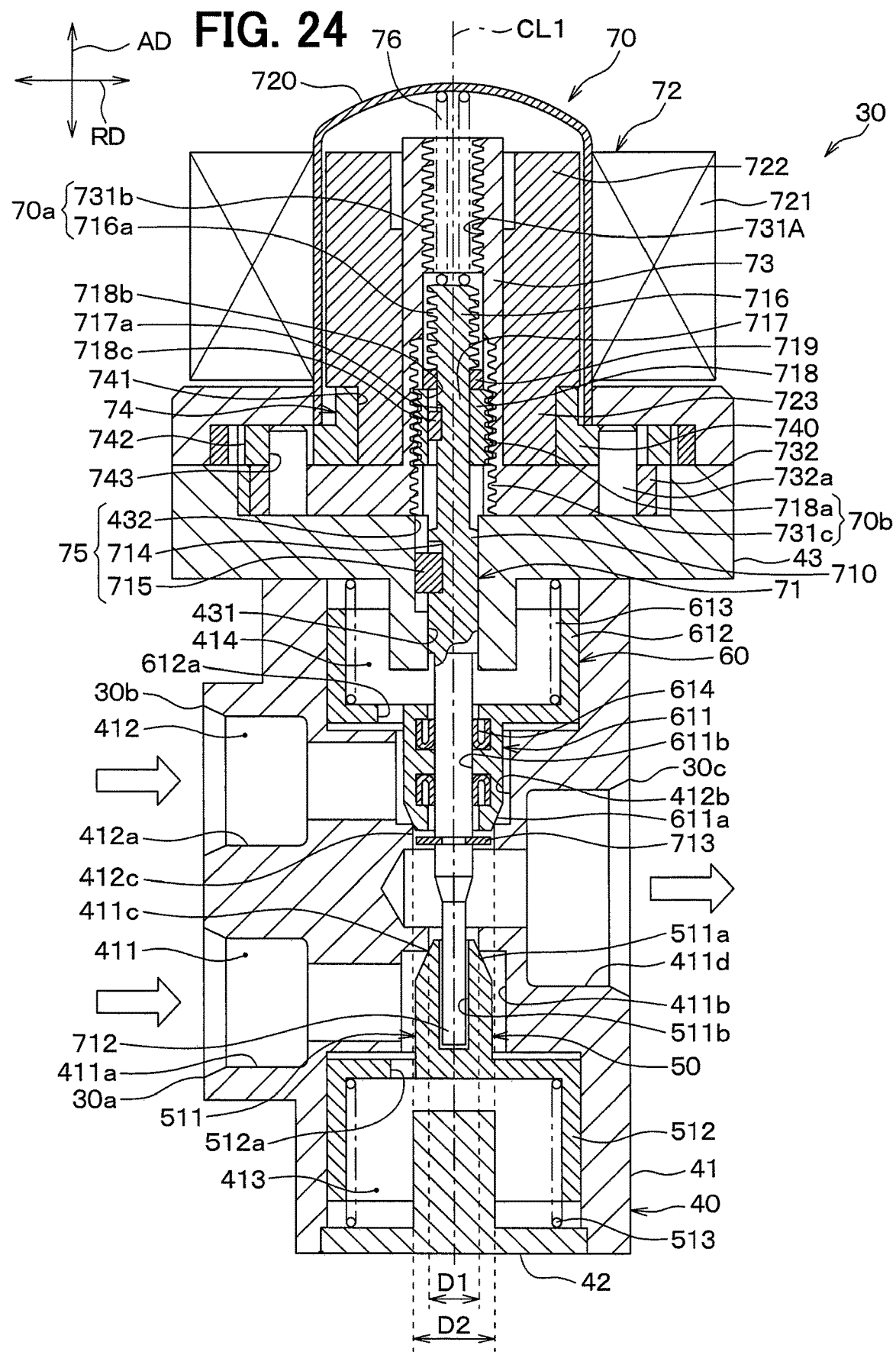
FIG. 24 it is a sectional view of the integrated valve taken along the axial direction according to a fifth embodiment.
Figure 25:
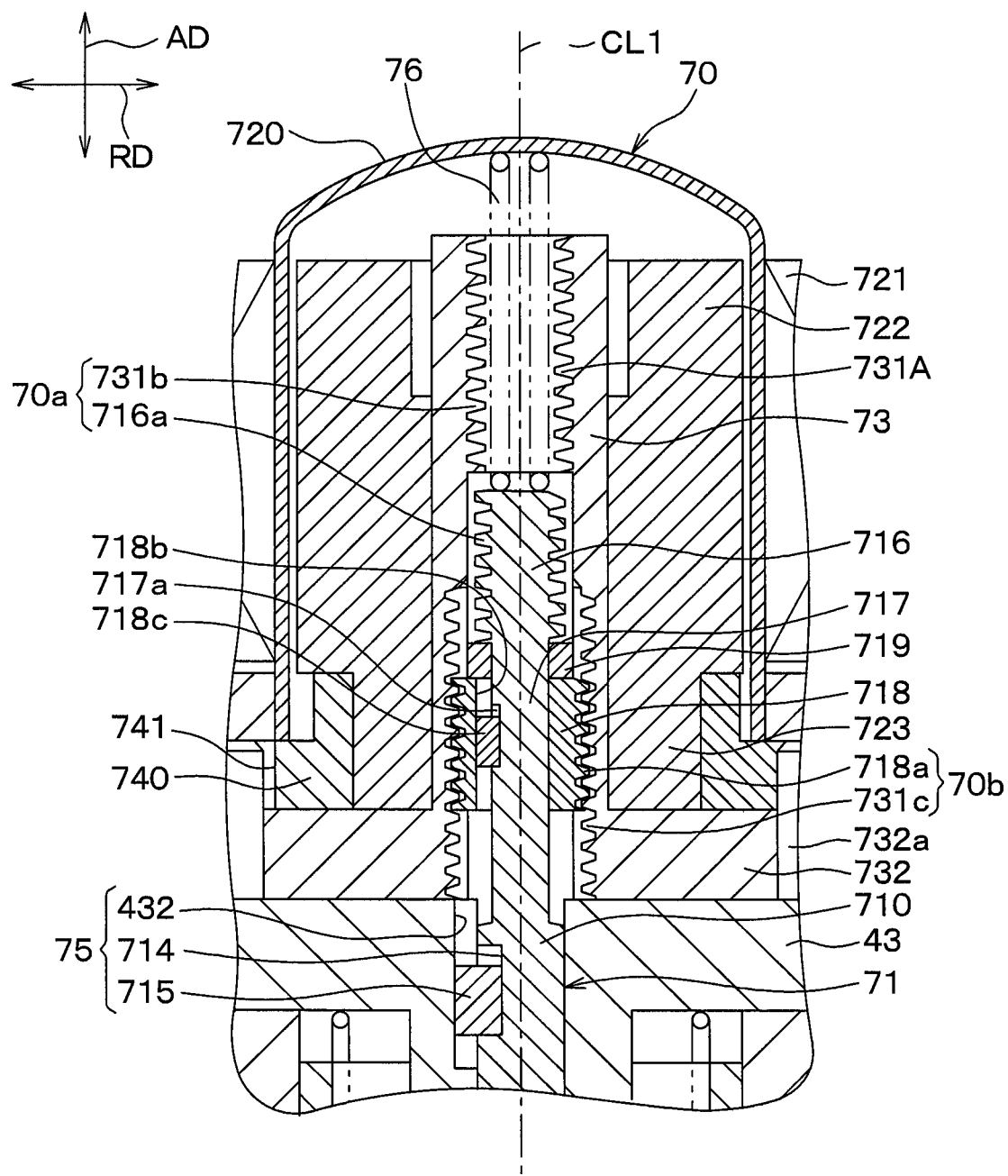
FIG. 25 it is an enlarged sectional view of a main portion of the integrated valve shown in FIG. 24.

Therefore, in the present embodiment, as shown in FIGS. 24 and 25, the elastic member 719, which is configured to be elastically deformable, is located at a portion of the main axis portion 710, which makes contact with the tubular portion 718. The elastic member 719 functions as a cushion member to reduce the urging force when an excessive urging force acts from the main axis portion 710 onto the tubular portion 718. In the present embodiment, as the elastic member 719, an elastic washer, which has a through hole extending therethrough in the axial direction AD, is employed. As the elastic member 719, another member than the elastic washer may be employed.

Other configurations are equivalent to those of the fourth embodiment, and an equivalent effect to that of the fourth embodiment can be produced also in the configuration of the present embodiment.

In particular, the present embodiment employs the configuration in which the elastic member 719 is interposed between the main axis portion 710 and the tubular portion 718. Even in a case where an excessive urging force acts from the main axis portion 710 onto the tubular portion 718, this enables to reduce the urging force by the elastic member 719. Therefore, it enables to prevent the first male thread 716a and the first female thread 731b from collapsing due to an excessive urging force from the tubular portion 718 onto the main axis portion 710.

Sixth Embodiment

In each of the above-described embodiments, an example, in which the actuator 70 being the actuator is applied to the integrated valve 30, and in which the integrated valve 30 has the two inlet holes 30a and 30b, has the one outlet hole 30c, and controls a flow quantity of fluid flowing from one of the inlet holes 30a and 30b, has been described. The example is not limiting. That is, in each of the above-described embodiments, an object, to which the actuator 70 is applied, is not dependent on the number of the inlet holes and the number of outlet holes of the flow control valve.

Figure 26:
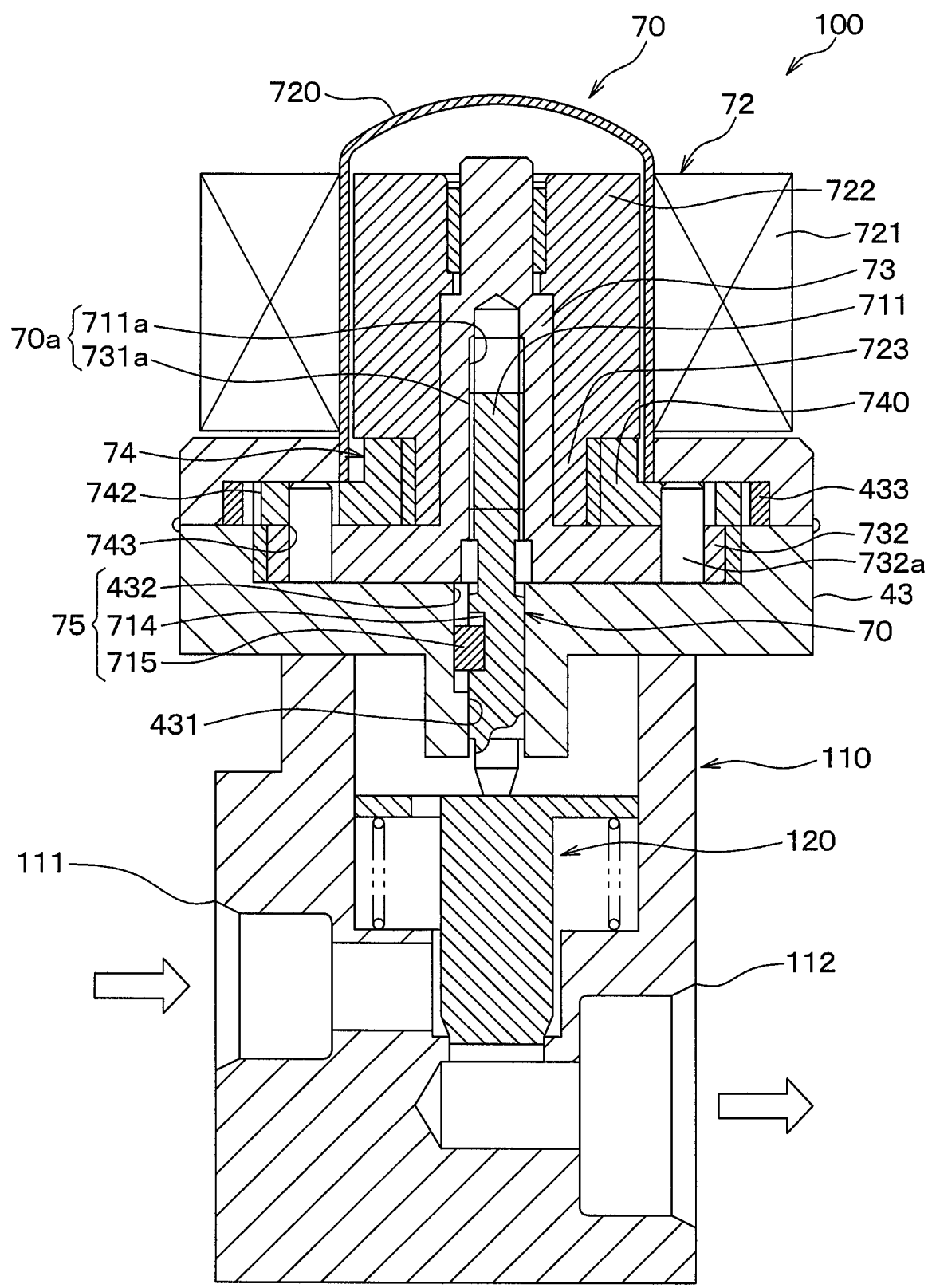
FIG. 26 it is a sectional view of a flow control valve taken along the axial direction according to a sixth embodiment.

As shown in FIG. 26, the actuator 70 described in each of the above-described embodiments may be used as, for example, an actuating unit of a valve element 120 of a flow control valve 100 in which a single inlet hole 111 and a single outlet hole 112 are formed in a housing 110.

The flow control valve 100 configured in this way includes an actuator equivalent to the actuator 70 described in the first embodiment. Therefore, it enables to downsize the axial direction AD similarly to the actuator 70 of the first embodiment.

Other Embodiment

Embodiments of the present disclosure have been described. The present disclosure is not limited to the above-described embodiments and can be modified arbitrarily. The electric flow control valve and the actuator of the present disclosure may be modified in various forms, for example, as follows.

Each of the above-described embodiments has described the electric flow control valve in which, as the feed screw mechanisms 70a and 70b, the male screw portion is equipped to the rod 71, and the female screw portion is equipped to the output shaft 73. The above-described embodiments are not limiting. The feed screw mechanisms 70a and 70b may have a configuration in which, for example, a female screw portion is equipped to the rod 71, and a male screw portion is equipped to the output shaft 73.

Each of the above-described embodiments has described the example in which the rotation prevention mechanism 75 is configured with the housing groove portion 432, the rod groove portion 714, and the rotation regulating member 715.

The above-described embodiments are not limiting. The rotation prevention mechanism 75 may be configured such that, for example, a pin is equipped to one of the rod 71 and the housing 40 to project in the radial direction RD, and a groove portion corresponding to the pin of the one is equipped to the other.

As in each of the above-described embodiments, the deceleration mechanism 74 is preferably added to the actuator 70 of the integrated valve 30. The above-described embodiments are not limiting. The deceleration mechanism 74 may not be equipped. The deceleration mechanism 74 may be configured with planetary gears or the like.

In each of the above-described embodiments, an example in which a stepping motor is employed as the electric motor 72, which forms the actuator 70 of the integrated valve 30, has been described. The above-described embodiments are not limiting. As the electric motor 72 of the actuator 70, for example, a servomotor may be employed.

In each of the above-described embodiments, an example in which the integrated valve 30 is applied to the refrigeration cycle 10 of the vehicle airconditioner 1 has been described. The above-described embodiments are not limiting The integrated valve 30 may be applied to a refrigeration cycle used for an airconditioner, a hot-water supply apparatus, of the like other than a one for a vehicle. The integrated valve 30 is not limited to be applied to a refrigeration cycle and may be applied to, for example. a cooling water circuit or the like.

In each of the above-described embodiments, an example, in which the actuator 70 being the actuator is applied to the device for controlling a flow quantity of fluid, has been described. The above-described embodiments are not limiting. An object, to which the actuator 70 being the actuator is applied, may be a device other than the device for controlling a flow quantity of fluid.

As in each of the above-described embodiments, the actuator preferably employs the form in which the female thread 731a of the output shaft 73, the eccentric shaft 723 of the rotor 722, and the internal gear 433 and the external gear 742 of the deceleration mechanism 74 are arranged to overlap one another in the radial direction RD of the rod 71. The above-described embodiments are not limiting. For example, the actuator may employ a form in which the eccentric shaft 723 of the rotor 722 and the female thread 731a of the output shaft 73 do not overlap one another in the radial direction RD of the rod 71.

As in each of the above-described embodiments, the actuator desirably employs a form in which the rotation transmission pin 732a is arranged on the outside of the rotor 722 so that the rotation transmission pin 732a does not overlap with the rotor 722 in the axial direction AD of the rod 71. The above-described embodiments are not limiting. For example, the actuator may employ a form in which the rotation transmission pin 732a and the eccentric shaft 723 of the rotor 722 overlap one another in the axial direction AD of the rod 71.

As in each of the above-described embodiments, the stator 721 is desirably located on the outside of the cover 720 to secure a sealing performance of the inside of the cover 720. The above-described embodiments are not limiting. For example, the stator 721 located inside the cover 720. When employing such a configuration, the stator 721 may be connected with an external wiring or the like through a hermetic connector or the like, which is excellent in air-tightness and liquid-tightness.

In the above-described embodiments, an element which forms an embodiment is not necessarily requisite unless the element is explicitly stated to be requisite, unless the element is clearly requisite in principle, or the like.

In the above-described embodiments, in a case where a numerical value, such as a number, a value, an amount, a range, and the like of an element of an embodiment has been described, the specific numerical value is not limiting, unless being explicitly stated to be requisite, unless being clearly limited to a specific value in principle, or the like.

In the above-described embodiments, in a case where a shape of an element, a physical relationship of an element, and the like, have been described, the shape, the physical relationship, and the like are not limiting, unless being stated clearly, unless the specific shape, the physical relationship, are the like are limiting in principle.

Technical Idea of Present Disclosure

The following subjects are included in the technical idea, which can be grasped from each of the above-described embodiments. Specifically, according to the first aspect shown by a part or all of the above-described embodiments, the electric flow control valve is applied to a device in which a flow quantity of fluid, which flows through the first fluid passage when the first fluid passage is full open, is smaller than a flow quantity of fluid, which flows through the second fluid passage when the second fluid passage is full open.

The low small clearance portion is formed in the passage, which is from the first inlet hole to the first valve seat portion within the first fluid passage, to be in the proximity of the first valve element. The small clearance portion is configured such that the passage length of the small clearance portion becomes shorter, as the first valve element is spaced from the first valve seat portion, and the passage length of the small clearance portion becomes longer, as the first valve element approaches the first valve seat portion.

In the range of the low flow quantity region within the first valve element control region, in which a flow quantity of fluid is controlled to be smaller than or equal to the predetermined flow quantity, the flow resistance of fluid in the small clearance portion is smaller than the flow resistance of fluid in the space between the first valve element and the first valve seat portion. In the range of the high flow quantity region within the first valve element control region, in which a flow quantity of fluid is controlled to be larger than the predetermined flow quantity, the flow resistance of fluid in the small clearance portion is larger than the flow resistance of fluid in the space between the first valve element and the first valve seat portion.

According to the second aspect, in the electric flow control valve, the seal portion of the first valve seat portion, which makes contact with the first valve element, is in a shape of the spherical surface.

According to the third aspect, in the electric flow control valve, the seal portion of the first valve element, which makes contact with the first valve seat portion, is in the flat shape. In addition, the portion of the first valve element, which corresponds to the seal portion of the first valve seat portion, is in the flat shape.

What is claimed is:
1. An electric flow control valve comprising:
 a housing internally formed with a first fluid passage, which is to guide fluid flowing from a first inlet hole to an outlet hole to cause fluid to flow to an outside, and a second fluid passage, which is to guide fluid flowing from a second inlet hole to the outlet hole;
 a first valve element arranged to be opposed to a first valve seat portion, which is formed at a portion of the housing forming the first fluid passage, to close the first fluid passage when making contact with the first valve seat portion and to open the first fluid passage when being spaced from the first valve seat portion;
 a second valve element arranged to be opposed to a second valve seat portion, which is formed at a portion of the housing forming the second fluid passage, to close the second fluid passage when making contact with the second valve seat portion and to open the second fluid passage when being spaced from the second valve seat portion; and
 an actuator to displace the first valve element and the second valve element in a range including:
  a first valve element control region in which the first fluid passage is opened to control a flow quantity of fluid flowing in the first fluid passage while the second fluid passage is closed;

a second valve element control region in which the second fluid passage is opened to control a flow quantity of fluid flowing in the second fluid passage while the first fluid passage is closed; and a both valve full close region in which both the first fluid passage and the second fluid passage are closed, wherein the first valve element and the second valve element are arranged to be coaxial in the housing, the actuator includes:

a rod to move along a shaft line of the first valve element and the second valve element to displace the first valve element and the second valve element in the range including the first valve element control region, the second valve element control region, and the both valve full close region;

an electric motor to generate a rotational driving force on supply of electricity;

an output shaft to output the rotational driving force of the electric motor to the rod;

a feed screw mechanism including a female screw portion, which is formed on one of the output shaft and the rod, and a male screw portion, which is formed on an other of the output shaft and the rod to mesh with the female screw portion, to convert the rotational driving force of the electric motor into a thrust force of the rod in an axial direction; and a rotation prevention mechanism to regulate rotation of the rod caused by the rotational driving force of the electric motor, and the rotation prevention mechanism includes:

a housing groove portion, which is formed at an inner circumferential periphery portion of the housing, which is opposed to an outer circumferential periphery portion of the rod, to extend in the axial direction of the rod;

a rod groove portion formed at the outer circumferential periphery portion of the rod to extend in the axial direction of the rod; and a rotation regulating member located in a space formed between the housing groove portion and the rod groove portion.

2. An electric flow control valve comprising:

a housing internally formed with a first fluid passage, which is to guide fluid flowing from a first inlet hole to an outlet hole to cause fluid to flow to an outside, and a second fluid passage, which is to guide fluid flowing from a second inlet hole to the outlet hole;

a first valve element arranged to be opposed to a first valve seat portion, which is formed at a portion of the housing forming the first fluid passage, to close the first fluid passage when making contact with the first valve seat portion and to open the first fluid passage when being spaced from the first valve seat portion;

a second valve element arranged to be opposed to a second valve seat portion, which is formed at a portion of the housing forming the second fluid passage, to close the second fluid passage when making contact with the second valve seat portion and to open the second fluid passage when being spaced from the second valve seat portion; and an actuator to displace the first valve element and the second valve element in a range including:

a first valve element control region in which the first fluid passage is opened to control a flow quantity of fluid flowing in the first fluid passage while the second fluid passage is closed;

a second valve element control region in which the second fluid passage is opened to control a flow quantity of fluid flowing in the second fluid passage while the first fluid passage is closed; and a both valve full close region in which both the first fluid passage and the second fluid passage are closed, wherein the first valve element and the second valve element are arranged to be coaxial in the housing, the actuator includes:

a rod to move along a shaft line of the first valve element and the second valve element to displace the first valve element and the second valve element in the range including the first valve element control region, the second valve element control region, and the both valve full close region;

an electric motor to generate a rotational driving force on supply of electricity;

an output shaft to output the rotational driving force of the electric motor to the rod;

a feed screw mechanism including a female screw portion, which is formed on one of the output shaft and the rod, and a male screw portion, which is formed on an other of the output shaft and the rod to mesh with the female screw portion, to convert the rotational driving force of the electric motor into a thrust force of the rod in an axial direction;

a rotation prevention mechanism to regulate rotation of the rod caused by the rotational driving force of the electric motor; and a deceleration mechanism to decelerate a rotational output of the electric motor and to transmit the output to the output shaft.

3. The electric flow control valve according to claim 2, wherein the deceleration mechanism includes an external gear, which is formed with a plurality of arc-shaped outer teeth on a radially outside, and an internal gear, which is formed with a plurality of arc-shaped inner teeth to mesh with the outer teeth of the external gear.

4. An electric flow control valve comprising:

a housing internally formed with a first fluid passage, which is to guide fluid flowing from a first inlet hole to an outlet hole to cause fluid to flow to an outside, and a second fluid passage, which is to guide fluid flowing from a second inlet hole to the outlet hole;

a first valve element arranged to be opposed to a first valve seat portion, which is formed at a portion of the housing forming the first fluid passage, to close the first fluid passage when making contact with the first valve seat portion and to open the first fluid passage when being spaced from the first valve seat portion;

a second valve element arranged to be opposed to a second valve seat portion, which is formed at a portion of the housing forming the second fluid passage, to close the second fluid passage when making contact with the second valve seat portion and to open the second fluid passage when being spaced from the second valve seat portion; and an actuator to displace the first valve element and the second valve element in a range including:

a first valve element control region in which the first fluid passage is opened to control a flow quantity of fluid flowing in the first fluid passage while the second fluid passage is closed;

a second valve element control region in which the second fluid passage is opened to control a flow quantity of fluid flowing in the second fluid passage while the first fluid passage is closed; and a both valve full close region in which both the first fluid passage and the second fluid passage are closed, wherein the first valve element and the second valve element are arranged to be coaxial in the housing, the actuator includes:

a rod to move along a shaft line of the first valve element and the second valve element to displace the first valve element and the second valve element in the range including the first valve element control region, the second valve element control region, and the both valve full close region;

an electric motor to generate a rotational driving force on supply of electricity;

an output shaft to output the rotational driving force of the electric motor to the rod;

a feed screw mechanism including a female screw portion, which is formed on one of the output shaft and the rod, and a male screw portion, which is formed on an other of the output shaft and the rod to mesh with the female screw portion, to convert the rotational driving force of the electric motor into a thrust force of the rod in an axial direction; and a rotation prevention mechanism to regulate rotation of the rod caused by the rotational driving force of the electric motor, a diameter of an opening of the first valve seat portion is smaller than a diameter of an opening of the second valve seat portion, the output shaft is formed with, as the female screw portion, a first female thread and a second female thread, which are different in a screw pitch from each other, the rod includes:

a main axis portion including a first urging portion, which is to make contact with the first valve element to displace the first valve element in a range of the first valve element control region, a second urging portion, which is to make contact with the second valve element to displace the second valve element in a range of the second valve element control region; and a tubular portion formed in a tubular shape to surround an outer circumferential periphery of the main axis portion to make contact with the main axis portion in the axial direction of the rod to displace the main axis portion in the axial direction of the rod, the main axis portion is formed with a first male thread to mesh with the first female thread, the tubular portion is formed with a second male thread to mesh with the second female thread, the first male thread and the first female thread are larger in a screw pitch than the second male thread and the second female thread, and the feed screw mechanism is configured to convert the rotational driving force of the electric motor into the thrust force of the rod in the axial direction by mesh of the second female thread with the second male thread in a range of the first valve element control region, in a range of the both valve full close region, and in a range of a low flow quantity region in the second valve element control region in which a flow quantity of fluid is controlled to be less than or equal to a predetermined flow quantity, and to convert the rotational driving force of the electric motor into the thrust force of the rod in the axial direction by mesh of the first female thread with the first male thread in a range of a high flow quantity region in the second valve element control region, in which a flow quantity of fluid is controlled at a flow quantity greater than the predetermined flow quantity.

5. The electric flow control valve according to claim 4, further comprising:

an elastic member arranged between a portion of the main axis portion, which makes contact with the tubular portion, and configured to be elastically deformable.

6. An actuator comprising:

a rod;

an electric motor including a rotor, which includes an eccentric shaft, and a stator, which is to generate a rotational magnetic field applied to the rotor to generate a rotational driving force on supply of electricity;

an output shaft to output the rotational driving force of the electric motor to the rod;

a feed screw mechanism including a female screw portion, which is formed on the output shaft, and a male screw portion, which is formed on the rod to mesh with the female screw portion, to convert the rotational driving force of the electric motor into a thrust force of the rod in an axial direction;

a rotation prevention mechanism to regulate rotation of the rod caused by the rotational driving force of the electric motor; and a deceleration mechanism to decelerate the rotational output of the electric motor and to transmit the output to the output shaft, wherein the deceleration mechanism includes:

an internal gear formed in a portion of the housing, which surrounds an outer circumferential periphery of the rotor; and an external gear formed with a plurality of outer teeth on an outer circumferential periphery to mesh with inner teeth of the internal gear and to rotate according to a difference between a number of the inner teeth and a number of the outer teeth when revolving in synchronization with the eccentric portion, and the external gear is located outside the eccentric shaft and is connected with the output shaft via a rotation transmission pin to transmit a rotational component to the output shaft.

7. The actuator according to claim 6, wherein the rotation transmission pin is located outside the rotor not to overlap with the rotor in the axial direction of the rod.

8. The actuator according to claim 6, wherein the output shaft is located so that at least a part of the female screw portion is located inside the rotor.

9. The actuator according to claim 6, wherein the output shaft, the rotor, and the deceleration mechanism are arranged so that the female screw portion, the eccentric shaft, the internal gear, and the external gear overlap with each other in a radial direction of the rod.

10. The actuator according to claim 6, wherein the stator of the electric motor is located outside a cover, which accommodates the rotor in a sealed state.

11. The actuator according to claim 6, wherein the electric motor is configured with a stepping motor.

12. The actuator according to claim 6, wherein the rotation prevention mechanism includes:
- a housing groove portion formed at an inner circumferential periphery portion of the housing, which is opposed to an outer circumferential periphery portion of the rod, to extend in the axial direction of the rod;
- a rod groove portion formed at the outer circumferential periphery portion of the rod to extend in the axial direction of the rod; and
- a rotation regulating member located in a space formed between the housing groove portion and the rod groove portion.

* * * * *